United States Patent
Liu et al.

(10) Patent No.: US 10,993,142 B2
(45) Date of Patent: Apr. 27, 2021

(54) METHOD AND APPARATUS FOR CIOT DEVICE DATA TRANSFER

(71) Applicants: Alcatel-Lucent USA Inc., Murray Hill, NJ (US); Alcatel Lucent, Boulogne-Billancourt (FR)

(72) Inventors: Jennifer Liu, Plano, TX (US); Alessio Casati, Bristol (GB)

(73) Assignee: Nokia of America Corporation, Murray Hill, NJ (US)

( * ) Notice: Subject to any disclaimer, the term of this patent is extended or adjusted under 35 U.S.C. 154(b) by 171 days.

(21) Appl. No.: 16/144,900

(22) Filed: Sep. 27, 2018

(65) Prior Publication Data

US 2019/0037441 A1 Jan. 31, 2019

Related U.S. Application Data

(63) Continuation of application No. PCT/US2017/024742, filed on Mar. 29, 2017.

(60) Provisional application No. 62/314,768, filed on Mar. 29, 2016.

(51) Int. Cl.
| | |
|---|---|
| *H04W 28/06* | (2009.01) |
| *H04W 4/70* | (2018.01) |
| *H04W 60/00* | (2009.01) |
| *H04W 76/27* | (2018.01) |

(52) U.S. Cl.
CPC ............ *H04W 28/06* (2013.01); *H04W 4/70* (2018.02); *H04W 60/00* (2013.01); *H04W 76/27* (2018.02)

(58) Field of Classification Search
CPC ........ H04W 28/06; H04W 4/70; H04W 60/00
See application file for complete search history.

(56) References Cited

PUBLICATIONS

Alcatel-Lucent et al. "Support of control plane CIoT EPS optimization.", 3GPP TSG_CT WG1 Meeting #95bis Nashville ( TN, USA, C1-160103, Jan. 11-15, 2016 (Year: 2016).*
Alcatel-Lucent et al. "EPS Attach for CIoT EPS optimization.", 3GPP TSG_CT WG1 Meeting #95bis, Nashville ( TN, USA, C1-160103, Jan. 11-15, 2016 (Year: 2016).*
PCTUS2017024742. International Search Report & Written Opinion (dated Jun. 20, 2017).
LG Electronics. "Two solutions for online small data transmission." 3GPP Draft; S2-102524_23888_NIMTC_Small_Data, 3rd Generation Partnership Project (3GPP) Mobile Competence Centre; 650 Route des Lucioles, F-06921 Sophia-Antipolis Cedex, France. vol. SA WG2, No. Kyoto (XP050434666) (May 4, 2010).

(Continued)

*Primary Examiner* — Siming Liu
(74) *Attorney, Agent, or Firm* — Loza & Loza, LLP; Jessica Smith

(57) ABSTRACT

A non-access stratum (NAS) control protocol includes procedures for control plane cellular internet of things (CP-CIoT) service requests and attach request. UE in idle mode may transmit an NAS service request message including user data to a mobility management entity (MME) over the control plane. The MME extracts the user data from the NAS service request message and determines a type of the user data. The MME may forward non-IP data to a Service Capability Exposure Function (SCEF) and forward IP data to a packet gateway.

20 Claims, 15 Drawing Sheets

(56) References Cited

PUBLICATIONS

Alcatel-Lucent et al. "Support of control plane CIoT EPS optimization." 3GPP Draft, C1-160105_24.301_R13_CP-CIOT, 3rd Generation Partnership Project (3GPP, Mobile Competence Centre; 650 Route des Lucioles, F-06921 Sophia-Antipolis Cedex, France. vol. CT WG1, No. Nashville TN (XP051061503) (Jan. 6, 2016).

3rd Generation Partnership Project; technical specification group core network and terminals; non-access-stratum (NAS) protocol for evolved packet system (EPS); Stage 3 (Release 13). 3GPP Standard; 3GPP TS 24.301, 3rd Generation Partnership Project (3GPP) Mobile Competence Centre; 650 Route des Lucioles, F-06921 Sophia-Antipolis Cedex, France. vol. CT WG1, No. V13.5.0 (XP051088177) (Mar. 18, 2016).

\* cited by examiner

METHOD AND APPARATUS FOR CIOT DEVICE DATA TRANSFER

CROSS-REFERENCE TO RELATED APPLICATIONS

This non-provisional application claims the benefit of priority under 35 U.S.C. § 120 to PCT Application No. PCT/US17/24742, filed on 29 Mar. 2017, the entire contents of which is incorporated herein by reference herein, and which claims the benefit of priority under 35 U.S.C. § 120 to U.S. Provisional Application No. 62/314,768, filed on Mar. 29, 2016, the entire contents of which is incorporated herein by reference.

BACKGROUND

Technical Field

The present disclosure relates generally to network communication and, more particularly, to an apparatus and method for facilitating Cellular Internet of Things (CIoT) device data transfer.

Description of Related Art

The following abbreviations are herewith expanded, at least some of which are referred to within the following description.
  3GPP 3$^{rd}$ Generation Partnership Project
  AKA Authentication and Key Agreement
  APN Access Point Name
  CIoT Cellular Internet of Things
  CN Core Network
  CP Control Plane
  CS Circuit Switched
  DRB Data Radio Bearer
  EHPLMN Equivalent HPLMN
  EMM EPS Mobility Management
  EPS Evolved Packet System
  ESM EPS Session Management
  GUTI Globally Unique Temporary ID
  HPLMN Home PLMN
  IE Information Element
  IEEE Institute of Electrical and Electronics Engineers
  IMSI International Mobile Subscriber Identity
  MME Mobility Management Entity
  MO Management Object
  MTC Machine-Type Communications
  NAS Non-Access Stratum
  NB Narrowband
  PDN Packet Data Network
  PGW PDN Gateway
  PLMN Public Land Mobile Network
  PS Packet Switched
  RAT Radio Access Technology
  RRC Radio Resource Control
  SCEF Service Capability Exposure Function
  SGW Serving Gateway
  SMS Short Message Service
  UE User Equipment Computers and computing devices are electronic machines used to store and process information, which in this context is referred to as data. Just as purely mechanical devices are characterized by their individual components and the interworking between them, computers are characterized by the interworking between their physical components, such as conductors and switches, and executable program instructions. The physical components of a computer and the executable program instructions are often referred to as hardware and software, respectively.

Computing devices may be connected together to share data and resources, and to otherwise communicate with each other. A group of computers connected together is usually referred to as a network. Networks may be fixed or relatively fixed in membership, as in a home or business network. They may also be ad hoc, comprised of whatever devices happen to be located and inclined in such a way as to begin communicating with each other.

Computers and computing devices are electronic machines used to store and process information, which in this context is referred to as data. Just as purely mechanical devices are characterized by their individual components and the interworking between them, computers are characterized by the interworking between their physical components, such as conductors and switches, and executable program instructions. The physical components of a computer and the executable program instructions are often referred to as hardware and software, respectively.

Computing devices may be connected together to share data and resources, and to otherwise communicate with each other. A group of computers connected together is usually referred to as a network. Networks may be fixed or relatively fixed in membership, as in a home or business network. They may also be ad hoc, comprised of whatever devices happen to be located and inclined in such a way as to begin communicating with each other.

Cellular telephone networks, sometimes referred to as PLMNs, originally allowed mobile telephones to connect with each other and with fixed telephones through a network. The PLMN, generally speaking, has an access portion and a core. The access network uses a dispersed array of antennae for communicating with the mobile phones over a wireless, usually radio channel. Each antenna is connected to a base station that in turn connects to the core network via one or more switches. The core network has a high capacity and provides the infrastructure for mobile callers to connect with each other and with other networks and the telephones or other stations reachable through them.

Many cellular networks now permit many devices, including many computing devices, to communicate via the network. Indeed, many UE 110 (user equipment) may be in reality computers that facilitate voice communications along with many other applications rather than simply a telephone. Such devices may include, for example, smart phones, tablets, watches, glasses and notebook computers. Through these devices, users can not only connect with other but with the Internet, a worldwide network of computer networks, to access a great variety of services such as email, texting, and streaming audio and video.

Increasingly, many devices not traditionally associated with telephony or computer networks are capable of discovering networks and making network connections. Such devices are used for a wide variety of purposes such as sensing environmental or physiological conditions and reporting them, keeping track of inventory and shipped items, locating personal items and pets, and many more uses. For convenience, these devices will also be referred to as UE 110, even when used in application not associated with individual subscribers in the same manner as, for example, mobile phones.

The network of all these devices is sometimes referred to as the Internet of Things (IoT). In many implementations, such devices may also communicate through existing cellular telephone networks and this may be referred to as the Cellular IoT (CIoT). Not unexpectedly, the presence of so many of these devices poses challenges to the networks that must handle the communication traffic.

UE 110 may communicate via a communication network in different ways. For example, a UE 110 may attach itself to the network using PDN connectivity in the user plane, which is a common way for a UE 110 to send and receive data. A UE 110 may also communicate using SMS messages. A UE 110 also communicates with the network in the control plane, for example to send and receive messages relating to the setup and maintenance of a communication session.

UE 110s, and especially CIoT type UE 110 devices, may at times have the need to transmit small amounts of data, for example simple status reports. A solution is needed for sending this type of information efficiently.

Note that the techniques or schemes described herein as existing, possible, or desirable are presented as background for the present application, but no admission is made thereby that these techniques and schemes or the need for them were heretofore commercialized or known to others besides the inventors.

SUMMARY

The following presents a summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one aspect, user equipment (UE) includes a wireless transceiver configured to communicate with a network and processing circuitry including at least one processing device and at least one memory device. The processing circuitry is configured to enter into an idle state without an established signaling connection to the network; obtain pending user data for transmission and generate an indication that subsequent downlink data is not expected. The processing circuitry is configured to insert the user data and the indication into a control plane service request message and transmit the control plane service request message to the network using a control signaling protocol.

In another aspect, a Mobility Management Entity node includes a network interface configured to communicate with a user equipment (UE) over a control plane signaling channel, and processing circuitry including at least one processing device and at least one memory device. The processing circuitry is configured to receive a control plane service request message from the UE; extract user data from a message information element in the control plane service request message; and extract an indication in the control plane service request message that subsequent downlink data is not expected. The processing circuitry is further configured to terminate a signaling plane session with the UE in response to the information element in the control plane service request that indicates subsequent downlink data is not expected and forward the user data to another network node.

In another aspect, user equipment (UE) includes a wireless transceiver configured to communicate with a network and processing circuitry including at least one processing device and at least one memory device. The processing circuitry is configured to enter into an idle state without an established signaling connection to the network; obtain pending short message service (SMS) data for transmission and generate an indication that subsequent downlink data is not expected. The processing circuitry is further configured to insert the SMS data and the indication into a control plane service request message and transmit the control plane service request message to the network using a control signaling protocol.

In one or more of the above aspects, the processing circuitry of the UE is configured to generate an indication that downlink data transmission is not needed by generating an information element in the control plane service request that indicates an acknowledgement subsequent to transmission of the control plane service request message to the network is not expected. In one or more of the above aspects, the processing circuitry of the UE is further configured to end control plane service request when the information element in the control plane service request indicates that subsequent downlink data is not expected. In one or more of the above aspects, the processing circuitry of the UE is further configured to generate a data type field that indicates an IP data type, wherein the user data includes an IP packet. In one or more of the above aspects, the processing circuitry of the UE is configured to enter into a registered state in response to transmission of the control plane service request message.

In one or more of the above aspects, the processing circuitry of the UE is further configured to insert the user data into a control plane service request message by inserting the user data into an information element and indicating a control plane network service in the control plane service request message. In one or more of the above aspects, the processing circuitry of the UE is further configured to indicate a control plane cellular internet of things (CP-IoT) service in the control plane service request message.

In one or more of the above aspects, the processing circuitry of the UE is further configured to generate a control plane attach request message and indicate a preferred network capability value in the control plane attach request message, wherein the preferred network capability value indicates at least one of: UP-CIoT, CP-CIOT or SMS-data-only. In one or more of the above aspects, the processing circuitry of the UE is further configured to receive an attach response indicating a rejection of the control plane attach request message, wherein a cause information element in the attach response includes a value indicating an unsupported CIoT optimization. In one or more of the above aspects, the indication in the control plane service request message that subsequent downlink data is not expected indicates an acknowledgement subsequent to transmission of the control plane service request message to the network is not expected.

In one or more of the above aspects, the processing circuitry of the MME is configured to determine a type of the user data includes non-IP data and forward the non-IP data to a node including a Service Capability Exposure Function (SCEF). In one or more of the above aspects, the processing circuitry of the MME is further configured to determine a type of the user data includes IP data and forward the IP data to a packet gateway.

In one or more of the above aspects, the processing circuitry of the MME is further configured to receive an attach request message from the UE; determine the attach request message requests CP-CIoT services with SMS only data without combined attach; and generate an attach response indicating a rejection of the attach request and including a cause information element in the attach response indicating an unsupported CIoT optimization.

Additional aspects will be set forth, in part, in the detailed description, figures and any claims which follow, and in part will be derived from the detailed description. It is to be understood that both the foregoing general description and the following detailed description is exemplary and explanatory only, and the claims are not restricted to the embodiments disclosed.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
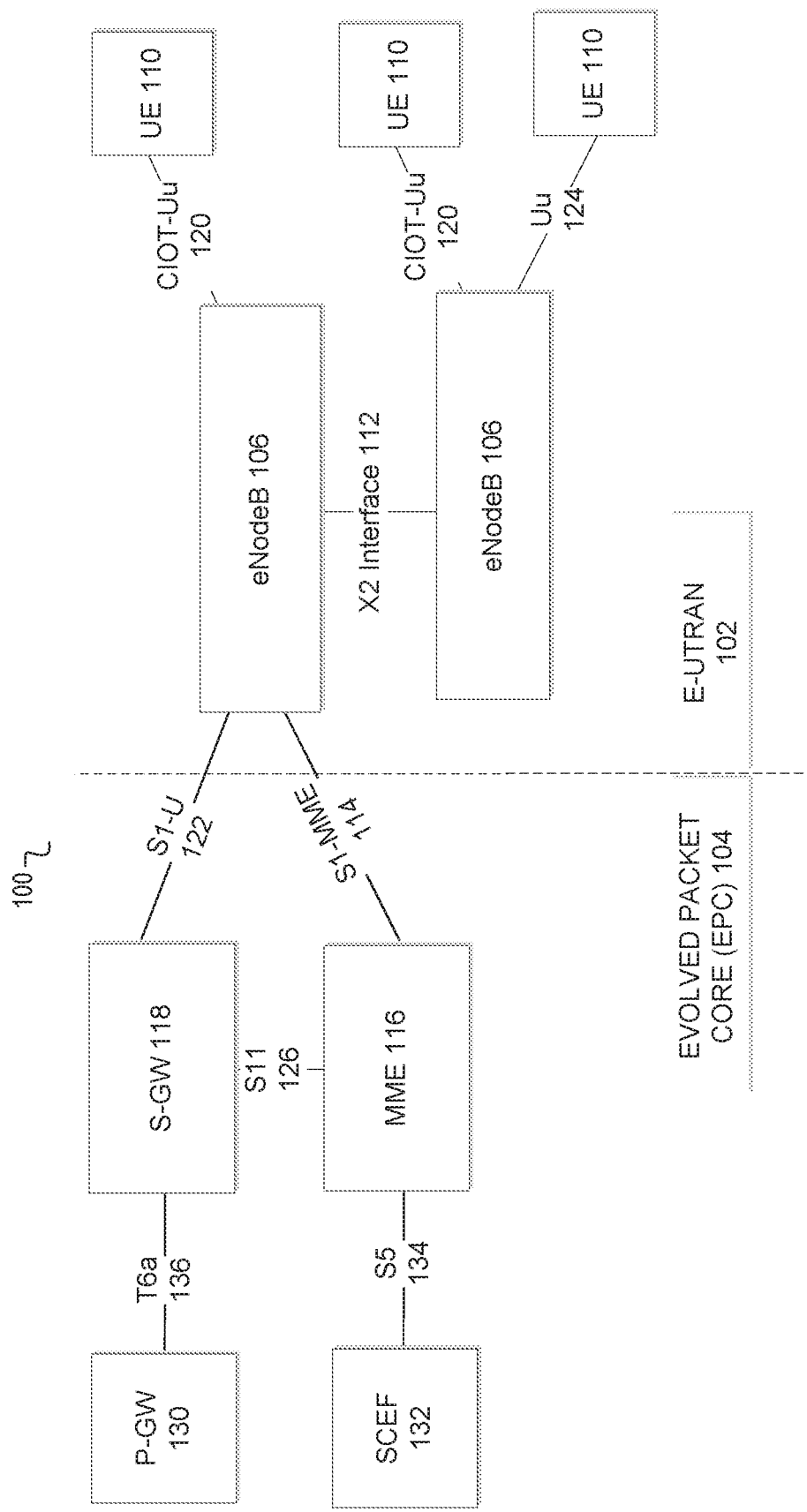
FIG. 1 illustrates a simplified block diagram including selected components of an exemplary communication network configuration in which embodiments described herein may be advantageously implemented.

Facilitating data transfer between a communication network and soon-to-be-ubiquitous devices in the CIoT (Cellular Internet of Things) is expected to promote network efficiency and capacity and thereby reduce capital and operating costs. One challenge of CIoT is in general to efficiently connect devices to the cellular network that only send and receive small amounts of data, e.g. a few tens or hundreds of bytes per day. Such small data transfers create a disproportionate signaling overhead. As a consequence, optimizations need to be specified to reduce the overhead that is required to establish and tear down a communication channel for small data transfers compared to broadband LTE data.

A number of embodiments of facilitating data transfer are disclosed herein. These embodiments are expected to be most advantageous when applied to small data transfers, for example a UE reporting its status to a management server via the cellular network.

As mentioned above, CIoT devices other than cellular or mobile phones will also be referred to as UE. While in practice a network may in managing device access distinguish between, for example, cell phones and autonomous monitoring devices, the methods and apparatus described here may be implemented to facilitate data transfers involving all types of UEs.

Overview—CIoT EPS Optimization Service

Two types of optimizations for the cellular internet of things (CIoT) in the evolved packet system (EPS) are described herein, the User Plane CIoT EPS optimization and the Control Plane CIoT EPS optimization. In Control Plane CIoT EPS optimization, uplink data from the UE is transferred from the eNB (or other CIoT RAN) to the MME using a signaling radio bearer. The MME may then transfer the data via the Serving Gateway (S-GW) to the Packet Data Network Gateway (P-GW). For non-IP data packets, the data may be transferred to a Service Capability Exposure Function (SCEF). Downlink data is transmitted over the same paths in the reverse direction, e.g. from the MME to the UE using a signaling radio bearer. In Control Plane CIoT EPS optimization, there is no data radio bearer set up, because the data packets are sent in a control plane message on a signaling radio bearer instead. Consequently, Control Plane CIoT EPS optimization is most appropriate for the transmission of infrequent and small data packets. The SCEF is a new function designed especially for machine type data. It is used for delivery of non-IP data over the control plane and provides an abstract interface for network services, such as authentication and authorization, discovery and access network capabilities.

In User Plane CIoT EPS optimization, data is transferred over data radio bearers via the SGW and the PGW. Thus, it creates some overhead on establishing the first RRC connection. However, in UP-CIOT EPS optimization, an additional feature of RRC connection resume is provided. The RRC connection feature allows for a more efficient resume of an RRC connection rather than establishing a new RRC connection for each data transfer.

FIG. 1 is a simplified block diagram illustrating selected components of an exemplary communication network configuration in which embodiments described herein may be advantageously implemented. Embodiments described herein may be implemented in various types of wireless networks including, but not limited to, the Universal Mobile Telecommunications System (UMTS) Terrestrial Radio Access Network (UTRAN), Long Term Evolution (LTE) Evolved UTRAN (E-UTRAN), and/or LTE-Advanced (LTE-A) or other wireless networks. In one implementation in which the network is an LTE type network, the overlay access network includes an evolved Universal Terrestrial Radio Access Network (E-UTRAN) 102 connected to an evolved packet core (EPC) 104. The E-UTRAN 102 includes at least one Universal Terrestrial Radio Access Network (UTRAN) node B or eNodeB or eNB 106. The eNodeBs 106 are interconnected with each other by means of an X2 interface 112.

The eNodeBs 106 provide an air interface (UF) to user equipment (UE 110) 110 including E-UTRA user plane (PDCP/RLC/MAC/PHY) protocols and radio resource control (RRC) protocols. The eNodeBs 106 are configured to perform radio resource management (RRM) functions as well as radio bearer control, radio admission control, connection mobility control, dynamic allocation of resources to UE 110s 110 in both uplink and downlink. In an embodiment, the eNodeBs 106 are also configured to provide the CIOT optimizations and functions described herein, including a CIoT user interface (Uu) 120 to user equipment UE 110. In other embodiments, different types of radio access networks (RAN) may be implemented, e.g. such as a separate base transceiver station (BTS) and radio network controller (RNC). Thus, a base station (BS), base transceiver station (BTS) or any type of RAN controller may perform the same or similar functions as described herein with respect to an eNodeB 106.

The eNodeBs are also connected by means of an S1 interface 114 to the EPC 104, and e.g., more specifically to a Mobility Management Entity (MME 116) 116 by means of the S1-MME 116 protocol 114, to a Serving Gateway (S-GW) 118 by means of the S1-U protocol 122. When connected to the EPC by S1 interface, the UE 110 is said to be in "S1 mode". The S-GW 118 communicates with a node including the SCEF capability 132 over an S5 interface 134. The S-GW 118 routes and forwards user data packets, while also acting as the mobility anchor for the user plane. The S-GW 118 communicates with a Packet Gateway (P-GW) 130 over a T6a interface 136. The packet gateway may be connected to a wide area network (Internet), application server, etc.

The MME 116 may include, for example, a combined logical node having an MME 116, a SGW, and a PGW. The MME 116 is a main control node for the LTE access-network providing signaling to the UE 110s and in an embodiment employs Non-Access Stratum (NAS) protocol. The NAS is a control plane signaling protocol used to convey control plane signaling between the User Equipment (UE 110) and the Mobility Management Entity (MME 116) for an LTE/E-UTRAN access. The NAS procedures are grouped in two categories: the EPS Mobility Management (EMM), and the EPS Session Management (ESM). The NAS protocols are described in more detail in 3GPP TS 24.301, Version 13.4 from December 2015 and entitled, "Non-Access-Stratum (NAS) protocol for Evolved Packet System (EPS)," which is hereby incorporated by reference herein.

In order for a UE 110 and an MME 116 to exchange NAS messages with each other, a signaling connection for exchanging NAS messages must be established between them. This connection is called EPS Connection Management (ECM) connection. It is a logical connection consisting of an assigned or scheduled RRC connection between a UE 110 and an eNB, and S1 signaling connection between the eNB and an MME 116. When an ECM connection is established/terminated, the RRC and S1 signaling connections are established/terminated as well. To a UE 110, an established ECM connection means having an RRC connection established with an eNB for the MME, and to an MME 116 it means having an S1 signaling connection established with the eNB for the UE. A UE 110 may have various states. The UE 110 may be in either an "EMM-Registered" or "EMM-Deregistered" state depending on whether the UE 110 is attached to, or detached from, the network. In addition, the UE 110 may have either an "EMM-Connected" or "EMM-Idle" state depending on whether a NAS signaling connection (i.e. ECM connection) is established or not. Likewise, the UE 110 may have either a "RRC-Connected" or "RRC-Idle" state depending on whether an RRC connection is established or not.

Modifications to the NAS protocol are described herein to include CIoT EPS optimizations. Generally speaking, a UE 110 may be said to support CIoT EPS optimization when it supports control plane CIoT EPS optimization or user plane EPS optimization or one or more other EPS CIoT optimizations described herein. For example, control plane CIoT EPS optimization includes signaling optimizations to enable efficient transport of user data (IP, non-IP or SMS) over control plane via the MME 116. User plane CIoT EPS optimization includes signaling optimizations to enable efficient transport of user data (IP or non-IP) over the user plane.

A UE 110 supporting CIoT EPS optimizations supports control plane CIoT EPS optimization or user plane CIoT EPS optimization and one or more other CIoT EPS optimizations when the UE 110 is in S1 mode. A UE 110 that is attached for EPS services with CP-CIoT EPS optimization has been accepted by the network for supporting CIoT EPS optimizations and control plane CIoT EPS optimization along with one or more other CIoT EPS optimizations. A UE 110 that is attached for EPS services with User plane CIoT EPS optimization has been accepted by the network as supporting CIoT EPS optimizations and user plane CIoT EPS optimization along with one or more other CIoT EPS optimizations. A UE 110 that is attached for EPS services with CIoT EPS optimization is attached for EPS services with CP-CIoT EPS optimization or attached for EPS services with user plane CIoT EPS optimization.

Described herein is a manner of signaling to support UE 110 in requesting CIoT services for data transmission and to support uplink and downlink transmissions of a variety of data types, including SMS and IP and non-IP data. New information elements to support CIoT services are also introduced.

Embodiment—Control Plane CIOT EPS Optimization Service when UE is in IDLE Mode

Currently it is not possible for a UE 110, for example a CIoT enabled device, to transmit user data or an SMS message when the UE 110 is in idle mode. In idle mode (e.g., EMM-IDLE mode), no NAS signaling connection (ECM connection) has been established with the MME. The UE 110 has not been assigned the physical resources, i.e. radio resources (SRB/DRB) and network resources (S1 bearer/S1 signaling connection) yet. To overcome this problem in CIoT, a UE 110 such as a CIoT enabled device is configured to transmit a control plane service request message that may include the user data over an unassigned or shared signaling radio bearer, e.g. a SRB1 for NAS messages using the dedicated control channel (DCCH). The UE 110 in EMM-IDLE mode can initiate the service request procedure and transmit the data in an information element in the control plane service request message over a shared control channel or random access channel. For example, the information element "ESM DATA TRANSPORT message" may include user data in the control plane service request. The service request message may be transmitted to the network prior to establishment of an assigned ECM connection, e.g. using a shared physical uplink control channel or random access control channel (e.g., using a random access channel (RACH) or uplink shared channel (SCH) control transport channel).

Figure 2:
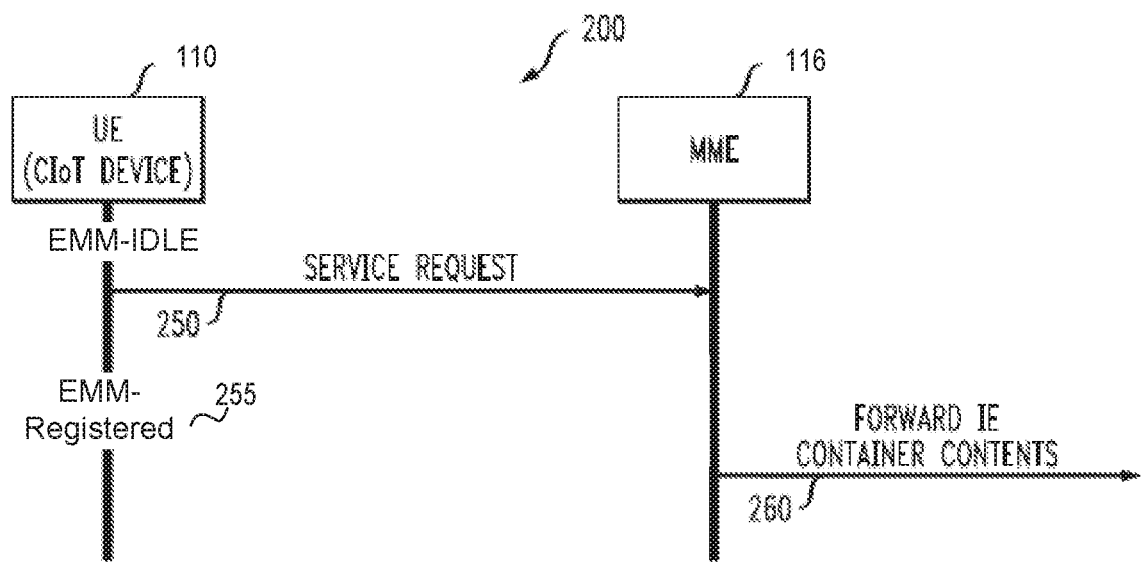
FIG. 2 illustrates a message flow diagram of a method according to one embodiment.

FIG. 2 is a message flow diagram illustrating a method 200 according to one embodiment. The control plane service request procedure usually establishes an ECM connection (radio and S1 bearers) when user data or signaling is to be transmitted by the UE 110. However, when a UE 110 in EMM-IDLE mode is attached for EPS services with CP-CIoT optimization, the service request procedure does not trigger data radio bearer and S1 bearer establishment. Instead, the control plane service request message may be used to transmit a small amount of user data to the MME 116.

In the embodiment of FIG. 2, UE 110, a CIoT enabled device, communicates with MME 116 using the NAS protocol with CIoT EPS optimization. The UE 110 is in an IDLE mode (EMM-IDLE mode) and is attached for CP-CIoT EPS services. Thus, the UE 110 is configured for EPS services with control plane CIoT EPS optimization. No ECM connection has been established between the UE 110 and the MME 116.

The UE 110 has pending IP or non-IP user data to transmit via a control plane radio bearer, and so the UE 110 generates and transmits a service request message 250. The service request 250 includes a service type, which is set to a value associated with a mobile device initiating a CIoT data transfer. It also includes the EPS bearer identity and a container IE that includes the CIoT data (e.g., an "ESM DATA TRANSPORT" message in the ESM message container IE). The control plane service type of the service request message may indicate a mobile originating request, such as a "mobile originating CIoT data transfer", In addition, the UE 110 includes in the service request 250 a release assistance information IE having a value to indicate whether downlink data transmission (for example, acknowledgements or responses to uplink data) subsequent to the uplink data transmission is expected. After transmitting device service request 250, the UE 110 then enters (step 255) the state EMM-REGISTERED.

In accordance with this embodiment, the MME 116 receives the device service request 250. When the UE 110 is attached for EPS services with CP-CIoT optimizations and the service type information element in the device service request 250 indicates a mobile originating request, e.g., a "mobile originating CIoT data transfer", it enters the state EMM-REGISTERED for the UE 110 (also represented by step 255). The MME 116 then forwards (step 260) the IE container contents according to the EPS bearer specified in the service request message 250. For example, for non-IP data, the MME 116 may transfer the user data in the "ESM DATA TRANSPORT" message in the ESM message container IE of the service request over the S5 interface 134 to the SCEF 132. In another embodiment, for IP data, the MME 116 may transfer the user data in the "ESM DATA TRANS-PORT" message in the ESM message container IE of the service request over the T6a interface 136 to the P-GW 130.

Note that the PDN connection and SCEF connection are established during the EPS attach procedure based on the data type usage, the MME 116 capabilities, and UE 110 configurations. The EPS attach procedure is described in more detail herein below.

Note also that in an embodiment, when a UE 110 that is attached for EPS services with CP-CIoT EPS optimizations initiates the mobile originating CP-CIoT data transfer by sending a service request message 250 with service type set to "mobile originating CIoT data transfer", the RRC establishment cause shall be set to mobile originating request, and the call type is set to "originating calls" in the service request message.

In an alternate embodiment, the UE 110 may include in service request 250 a service type having a value associated with a mobile originating SMS transfer. In this embodiment, the SMS message is included in the container IE in the service request 250, and a flow identity field is set to 0000 (and ignored). In this alternate embodiment, when a UE 110 that is attached for EPS services with CP-CIoT EPS optimizations initiates the mobile originating CP-CIoT data transfer by sending a service request message 250 with service type set to "mobile originating SMS transfer", the RRC establishment cause shall be set to mobile originating request, and the call type is set to "originating SMS".

For Mobile originated CIoT data transfer (e.g., the RRC establishment cause is set to mobile originating request) using Control plane CIoT EPS optimization, the procedure is considered completed on the UE 110 side when the service request message is transmitted successfully.

Upon receipt of the service request message 250, the MME 116 may initiate EMM common procedures, e.g. the authentication procedure and security mode control procedure, described in 3GPP TS 24.301, Section 5.6.1.3, dated December 2015. Once a current EPS security context exists, until the secure exchange of NAS messages has been established for the NAS signalling connection, the receiving EMM entity in the MME 116 may process the service request message. In certain situation, the MAC included in the service request message may fail the integrity check or cannot be verified, as the EPS security context is not available in the network. The service request message may still be processed by the MME 116 even when the MAC fails the integrity check or cannot be verified, as in certain situations the MAC may be sent by the UE 110 protected with an EPS security context that is no longer available in the network.

The MME 116 may consider the service request procedure successfully completed when it receives the SERVICE REQUEST message from the UE 110 and may also enter the state EMM-REGISTERED.

In an embodiment, the MME 116 releases the S1 connection when the release assistance information element in the service request message 250 indicates that subsequent downlink data is not expected. When the release assistance information is not provided or indicates that subsequent downlink information is expected, the S1 connection between the MME 116 and the UE 110 is retained.

In a preferred embodiment, the service request message 250, where a mobile originated CIoT data transfer when the UE 110 is in EMM-IDLE mode, may include one or more of the values in the following table:

| IEI | Information Element | Type/Reference | Presence | Format | Length |
|---|---|---|---|---|---|
| | Protocol discriminator | Protocol discriminator | M | V | ½ |
| | Security header type | Security header type | M | V | ½ |
| | Data service request message identity | Message type | M | V | 1 |
| | Service type | Device service type | M | V | ½ |
| | NAS key set identifier | NAS key set identifier | M | V | ½ |
| XX | EPS Bearer Id | Flow identity | M | V | ½ |
| XX | Release assistance information | Release assistance information | M | V | ½ |
| XX | CIoT device message container | CIoT device message container | M | LV-E | 5-n |
| D- | Device properties | Device properties | O | TV | 1 |

Figure 3:
FIG. 3 illustrates a block diagram including a structure of a service type information element according to one embodiment.

FIG. 3 illustrates a block diagram including a structure of a service type information element according to one embodiment. In an embodiment, the device service type information element 300 may take the form shown in FIG. 3, and may apply the device type values shown in the following table:

| Device service type value (octet 1) Device service type value | | | | |
|---|---|---|---|---|
| Bits | | | | |
| 4 | 3 | 2 | 1 | |
| 0 | 0 | 0 | 1 | mobile originating CIoT data transfer |
| 0 | 0 | 1 | 0 | mobile originating SMS transfer |

All other values may be reserved.

The purpose of the Device service type information element is to specify the purpose of the service request procedure.

Figure 4:
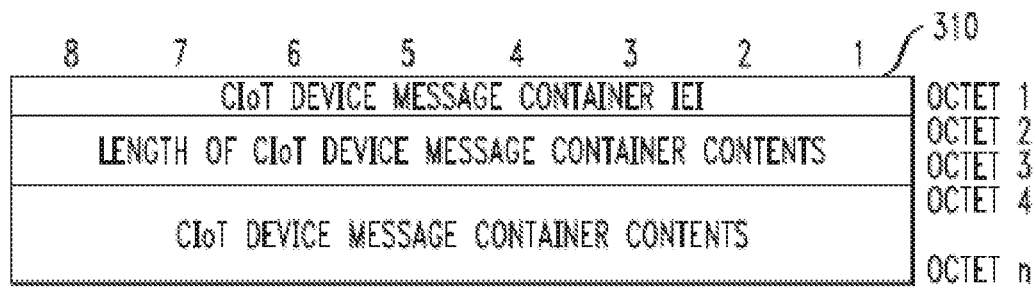
FIG. 4 illustrates a block diagram including a structure of a device message container element according to one embodiment.

FIG. 4 illustrates a block diagram including a structure of a device message container element according to one embodiment. In an embodiment, a CIoT device message container 310 may take the form shown in FIG. 4. The message container 310 is used for mobile originating CIoT device IP or non-IP data transfer or mobile originating SMS transfer. This information element is used to encapsulate CIoT data transferred between the UE 110 attached for EPS services with CP-CIoT optimization and the MME 116. The contents of the CIoT device message container include the non-IP or IP user data (e.g., the CIoT device message) in the control plane service request or SMS data. In another embodiment, control plane service request may include a message container 310 for SMS only data and another message container 310 for IP/non-IP data. Since SMS data has a different format, the service request message may include message containers with different formats for the SMS data and the IP/non-IP data.

Figure 5:
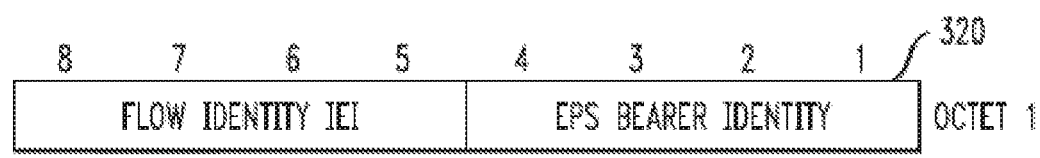
FIG. 5 illustrates a block diagram including a structure of a flow identity information element according to one embodiment.

In an embodiment, a flow identity information element 320 may take the form shown in FIG. 5. In this embodiment, the flow identity information element 320 indicates an EPS bearer identity for routing the user data. As mentioned above, for SMS transfer (when device service type is set to "mobile originating CIoT SMS transfer", the flow identity field 320 is set to "0000" and ignored.

Figure 6:
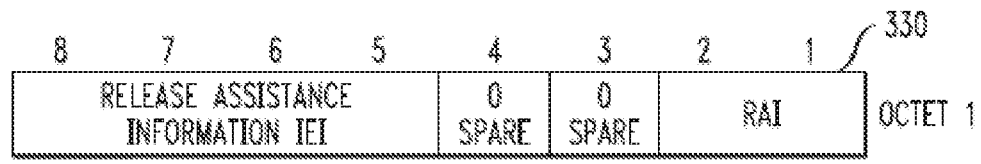
FIG. 6 illustrates a block diagram including a structure of a release assistance information element according to one embodiment.

In another embodiment, a release assistance information element 330 may take the form shown in FIG. 6. The Release assistance information provides additional S1 connection release handling related information to the MME 116. The release assistance IE may include the release assistance indicator (RAI) values in the following table:

| Release assistance Indicator values (RAI) (octet 1) | | |
|---|---|---|
| Bit | | |
| 2 | 1 | |
| 0 | 0 | RAI information not provided |
| 0 | 1 | Subsequent downlink data (e.g. acknowledgements or response) not expected. |
| 1 | 0 | Subsequent downlink data (e.g. acknowledgements or response) expected |

Bits 4 to 3 of octet 1 are spare and may be coded as zero.

The MME 116 releases the S1 connection when the release assistance information element in the service request message 250 indicates that subsequent downlink data is not expected. When the release assistance information is not provided or indicates that subsequent downlink information is expected, the S1 connection between the MME 116 and the UE 110 is retained.

Figure 7:
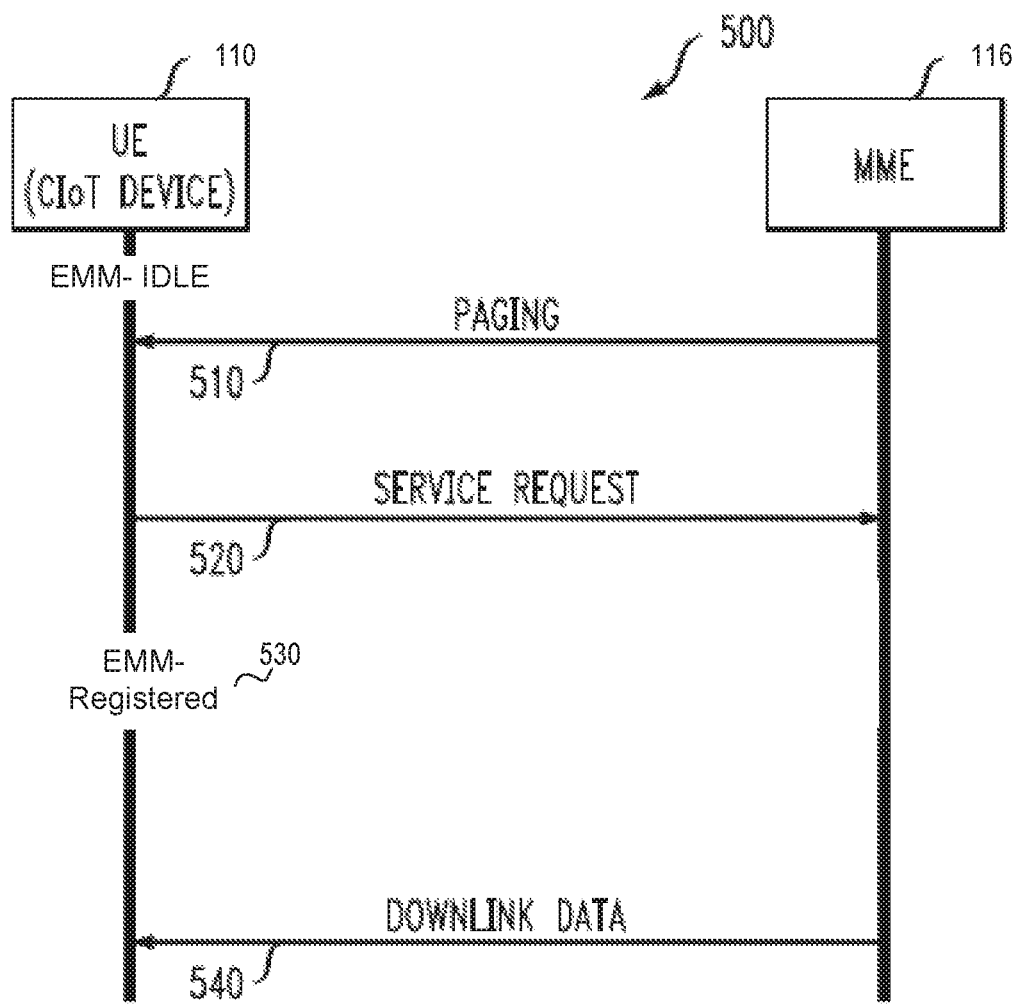
FIG. 7 illustrates a message flow diagram of a method according to one embodiment.

Embodiment—MME 116 Initiated CP-CIoT Services when the Network has User Data Pending and the UE 110 is in EMM-IDLE Mode The network may use a similar process to send information to the UE 110 over the control plane using CP-CIoT services. FIG. 7 is a message flow diagram illustrating a method 500 according to one embodiment. In the embodiment of FIG. 7, UE 110, a CIoT enabled device, communicates with MME 116. The UE 110 is EPS attached for CP-CIoT, and the MME 116 has pending user data for the UE 110. The MME 116 transmits a paging request 510 to the UE 110. In an embodiment, the paging request includes a core network (CN) domain indicator with a value corresponding to packet switch "PS" from the network. In response to the paging request, the UE 110 transmits a service request message 520 (similar to the service request message 250 described herein). The UE 110 enters (step 530) the state EMM-REGISTERED. The UE 110 may reset a service request attempt counter (not shown) in case the service request attempt fails. The attempt counter provides a number of failed attempts that the UE 110 tries to send the service request message before aborting the procedure.

In accordance with this embodiment, when the MME 116 receives the service request 520 and the UE 110 is attached for EPS services with CP-CIoT optimizations, it enters the state EMM-REGISTERED for the UE 110 (also represented by step 530). The MME 116 then sends (step 540) the downlink user data to the UE 110.

Embodiment—Service Request not Successful

Figure 8:
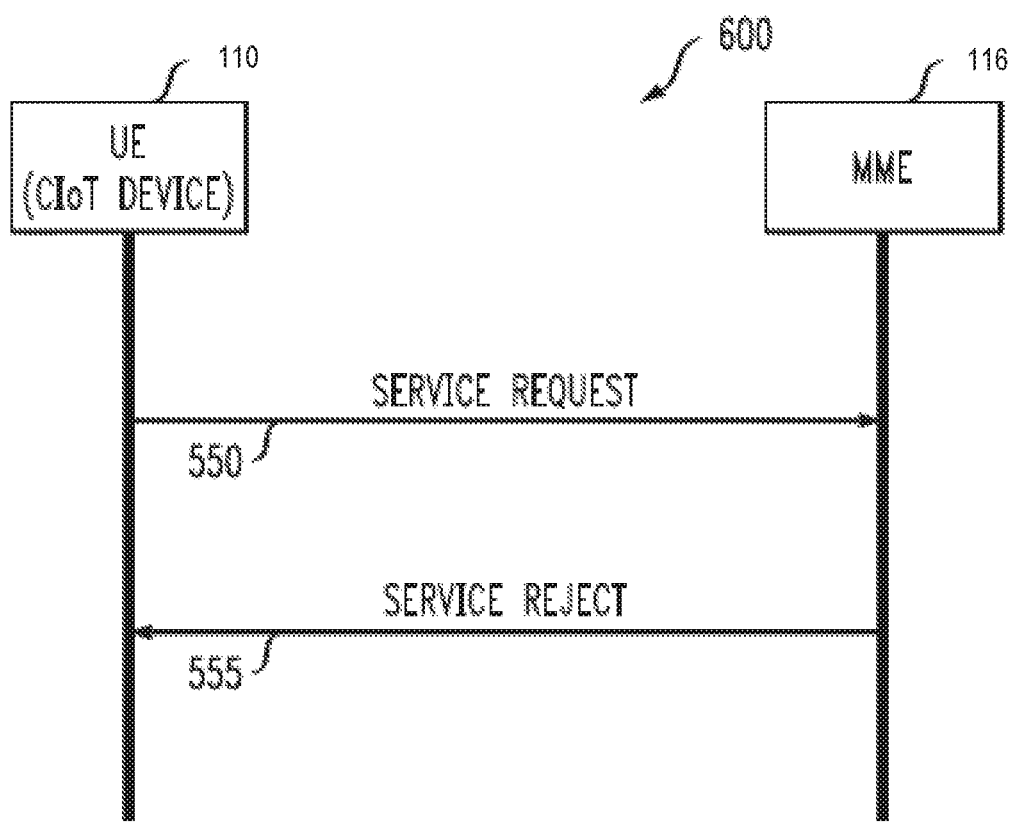
FIG. 8 illustrates a message flow diagram of a method according to one embodiment.

In some instances, a service request is not successful. FIG. 8 is a message flow diagram illustrating a method 600 according to one embodiment. In the embodiment of FIG. 8, UE 110, a CIoT enabled device, communicates with MME 116 by sending a service request 550 (e.g., similar to service request 250). In this embodiment, the network does not accept the service request, and the MME 116 transmits a service reject message 555. When the UE 110 receives the service reject message 555, it enters the state EMM-DEREGISTERED and performs a new attach procedure as described in more detail with respect to FIG. 9. There may be several reasons for MME 116 to transmit a service reject to the UE 110. For example, the service request message may fail the integrity check and the UE 110 has only PDN connections for non-emergency bearer services established or has no PDN connections established. In this case, the service reject message 555 may include EMM cause #9 "UE 110 identity cannot be derived by the network" and keep the EMM-context and EPS security context unchanged.

For another example, if the service request for mobile originating CIoT data transfer is rejected due to a lack of matching identity or context in the network (due, for example, to network node failure or partial failure, such as right after network node restart or reset), the service reject message 555 may include the EMM cause IE, which can be set to EMM cause value to #9 "UE 110 identity cannot be derived by the network" or other cause values depending on the failure type.

As another example, if the service request for mobile originating CIoT data transfer is rejected due to the circumstance that a network node (such as the MME 116) does not support CIoT control plane optimization, the service reject message may include an EMM cause IE, which can be set to EMM cause value to #43 "CIoT optimization not supported".

Figure 9:
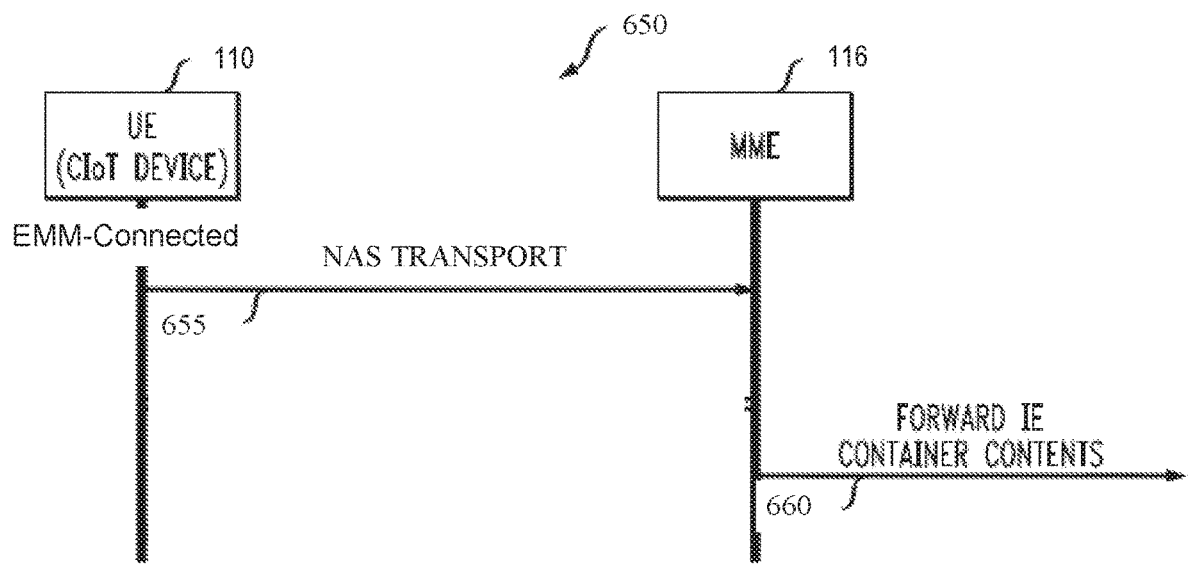
FIG. 9 illustrates a logical flow diagram of an embodiment of a method for CIoT services.

Embodiment—Control Plane CIOT EPS Optimization Service when UE 110 is in Connected Mode FIG. 9 illustrates a logical flow diagram of an embodiment of a method 650 for CIoT services. In this embodiment, the UE 110 is in a connected mode or EMM-Connected mode and has an allocated ECM connection. For example, the UE 110 has been assigned physical resources, i.e. radio resources (SRB/DRB) and network resources (S1 bearer/S1signaling connection).

When the UE 110 is in EMM-CONNECTED mode and attached for CP-CIoT EOS services, the UE 110 may forward user data, such as an SMS or IP or Non-IP data, as an encapsulated NAS message. For example, when a SMS message needs to be transferred, the UE 110 may encapsulate the SMS message in an NAS message container IE of an UPLINK NAS TRANSPORT message (Step 655). Upon request from the SMS entity to send an SMS message, the EMM entity in the UE 110 initiates the procedure by sending an UPLINK NAS TRANSPORT message including the SMS message in the NAS message container IE. The UE 110 may then pass the NAS message to lower protocol layers (PDCP/RLC/MAC/PHY) for processing and transmission to the MME 116 in a NAS transport message.

When the user data type is "IPv4" or "IPv6" or "non-IP", the UE 110 may format the CIoT data container IE. In this case, the message PDN data type field is set to "IPv4" or "IPv6" or "non-IP" as appropriate and a Subsequent Downlink Data Indicator (SSD-IND) is set to indicate whether downlink data transmission (e.g. acknowledgements or responses to UL data) subsequent to the Uplink Data transmission is expected. In addition, an S1 Release Indicator (SSD-REL-S1) is set to indicate whether the S1 connection has to be released when the downlink data is received. The data to be transferred may then be included in a CIoT data field, and then encapsulate the CIoT data container IE in the generic message container IE of the uplink generic NAS Transport message with the Generic Message Container Type set to "CIoT data message container" and pass the NAS message to the lower layer.

When the MME 116 receives the uplink NAS transport message with the Generic Message Container Type set to "CIoT data message container", the MME 116 forwards the user data (e.g. the contents in the NAS message container IE) at step 660. The forwarding action of the MME 116 varies according to the CIoT data type. When an SMS message is received in the UPLINK NAS TRANSPORT message (presuming the MME 116 supports SMS), the MME 116 may forward the mobile originated short messages to an SMS-IWMSC associated to the SMS-SC as indicated by the UE 110.

When the data type is "IPv4" or "IPv6" or "non-IP", the MME 116 may transfer the user data using either PDN connection or SCEF connection. In addition, the MME 116 releases the S1 connection if a Subsequent Downlink Data Indicator (SDD-IND) indicates that downlink data transmission is not expected. When a Subsequent Downlink Data Indicator (SDD-IND) indicates that downlink data transmission (e.g. acknowledgements or responses to uplink data) subsequent to the uplink data transmission is expected, the MME 116 may retain the S1 connection. Note that any PDN connections or SCEF connections are established during an EPS attach procedure based on the Data Type usage, the MME 116 capabilities and UE 110 configurations.

In this embodiment, if subsequent downlink data is expected by the UE 110, and if S1 Release Indicator (SSD-REL-S1) is received in a previous uplink data message, the UE 110 indicates that the S1 connection needs to be released when subsequent downlink data is received. The MME 116 releases the S1 connection after the MME 116 sends the subsequent downlink data to the UE 110.

Figure 10:
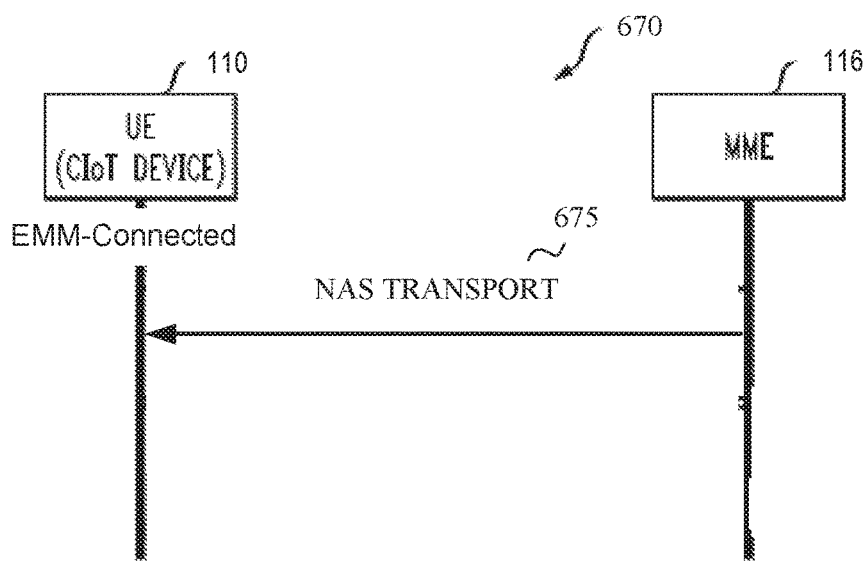
FIG. 10 illustrates a logical flow diagram of an embodiment of a method for CIoT services.

FIG. 10 illustrates a logical flow diagram of an embodiment of a method 670 for CIoT services. CIoT may also be initiated by the network when the UE 110 is in EMM CONNECTED mode. In an embodiment, the MME 116 may transmit a downlink NAS transport message including user data to the UE 110 (step 675). For example, the MME 116 may set the Generic Message Container Type to "CIoT Data message container" in a Downlink Generic NAS Transport message. Presuming that the Control Plane CIoT EPS Optimization is activated and the UE 110 is in EMM-CONNECTED mode, the MME 116 may encapsulate the user data (SMS or IP or Non-IP data) according to data type. If an SMS message is to be transferred, the UE 110 may encapsulate SMS message in the NAS message container IE of the DOWNLINK NAS TRANSPORT message. If the type of the data to be transferred is "IPv4" or "IPv6" or "non-IP", the UE 110 may format the CIoT data container IE by setting the PDN data type field to "IPv4" or "IPv6" or "non-IP", as appropriate. The MME 116 may then include the data to be transferred in a CIoT data field and encapsulate the CIoT data container IE in the Generic message container IE of the DOWNLINK GENERIC NAS TRANSPORT message, with the Generic Message Container Type set to "CIoT data message container" and pass the NAS message to the lower layer.

In this embodiment, upon receiving encapsulated NAS message, the UE 110 may respond according to data type. If an SMS message is received in the DOWNLINK NAS TRANSPORT message, the EMM entity in the UE 110 may forward the contents of the NAS message container IE to the SMS entity. If a DOWNLINK GENERIC NAS TRANSPORT message is received with the Generic Message Container Type set to "Small Data message container", the EMM entity in the UE 110 shall forward the CIoT data field of the Generic NAS message container IE of DOWNLINK GENERIC NAS TRANSPORT message to the application.

In this embodiment, if subsequent uplink data transfer is needed after receiving the encapsulated downlink NAS messages, the UE 110 may encapsulate the subsequent SMS or IP or Non-IP data in the NAS message, for example, as described above. If the data type is "IPv4" or "IPv6" or "non-IP", the UE 110 may indicate SSD-IND and SSD-REL-S1 release assistance information in the CIoT data container IE.

Embodiment—Attach Procedure for CIoT EPS Optimization Services

When a UE 110 is not attached to the network, the MME 116 does not have current location information of the UE 110. The MME 116 may have prior tracking area (TA) information but not a current location of the UE 110 with an accuracy of a cell. In the event that a UE 110 is not attached for EPS services, an attach procedure may be performed, for example as described below.

Figure 11:
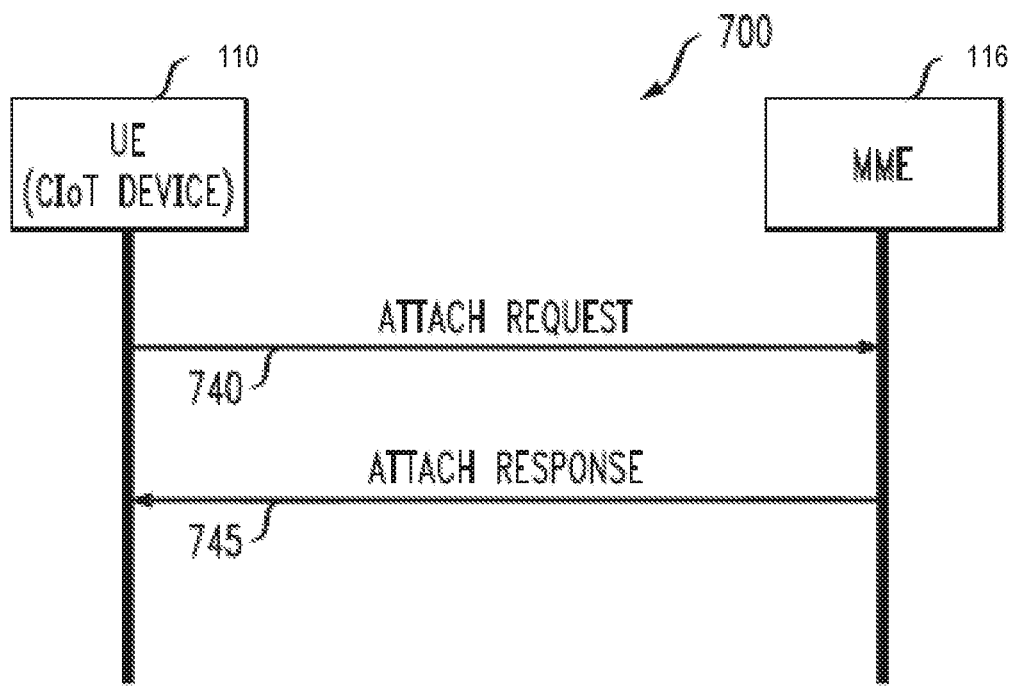
FIG. 11 illustrates a message flow diagram of an attach method 700 according to one embodiment.

FIG. 11 illustrates a message flow diagram of an attach method 700 according to one embodiment. In the embodiment of FIG. 9, UE 110, a CIoT device, communicates with MME 116 by sending an attach request message 740. If the UE 110 supports CIoT optimizations and requests the use of CIoT optimizations, the attach request message 740 may indicate the UE 110's CIoT capabilities and its preferred network behavior, for example in a preferred network behavior indication information element (IE). This may include the supported type of CIoT optimizations (for example either CP-CIoT or UP-CIoT or both), the preferred optimization usage (CP-CIoT or UP-CIoT), whether SMS without combined attach is requested, whether it supports S1U data transfer, and the data type that it intends to use for small data transfer (SMS data only or SMS along with IP data or non-IP data combination). In a preferred embodiment, a UE 110 that supports NB-IOT RAT always indicates support for Control Plane CIoT EPS optimization.

In one embodiment, the attach request message 740 may include one or more of the following information elements summarized in the following table:

| Information Element | Type/Reference |
| --- | --- |
| Protocol discriminator | Protocol discriminator |
| Security header type | Security header type |
| Attach request message identity | Message type |
| EPS attach type | EPS attach type |
| ... | |
| Preferred network behaviour indication (aka UE network capability) | Preferred network behaviour (aka UE network capability) |

Figure 12:
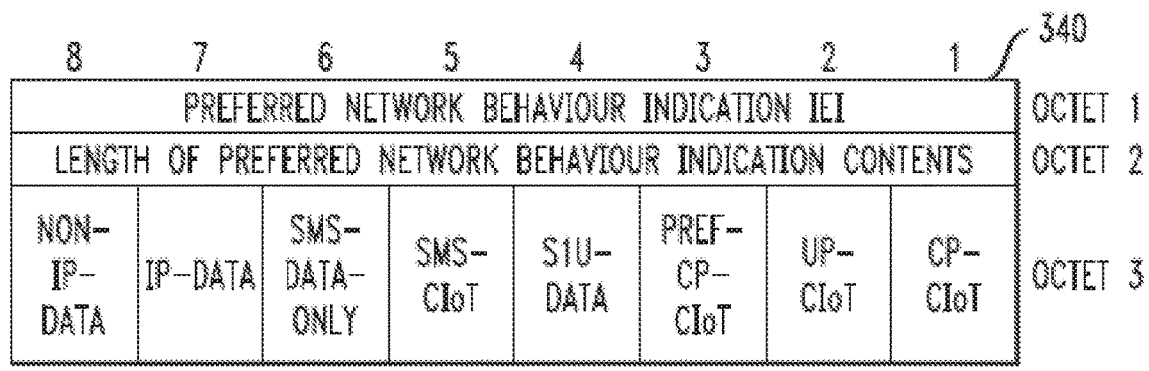
FIG. 12 illustrates a block diagram including a structure of a preferred network behavior indication information element according to one embodiment.

FIG. 12 is a block diagram illustrating the structure of a preferred network behavior indication information element 340 according to one embodiment. The preferred network behavior indication element 340 may also be called a "UE network capability" and may apply the values given in the following table:

| Control Plane CIoT EPS optimization indicator (CP-CIoT) (octet 3, bit 1) | |
| --- | --- |
| Bit 1 | |
| 0 | Control Plane CIoT EPS optimization not supported |
| 1 | Control Plane CIoT EPS optimization supported |
| User Plane CIoT EPS optimization indicator (UP-CIoT) (octet 3, bit 2) | |
| Bit 2 | |
| 0 | User Plane CIoT EPS optimization not supported |
| 1 | User Plane CIoT EPS optimization supported |
| Prefer control Plane CIoT EPS optimization indicator in EPC (PREF-CP-CIoT) (octet 3, bit 3) | |
| Bit 3 | |
| 0 | Control Plane CIoT EPS optimization not preferred |
| 1 | Control Plane CIoT EPS optimization preferred |
| S1-U Data transfer (S1U-DATA) (octet 3, bit 4) | |
| Bit 4 | |
| 0 | S1-U data transfer not supported |
| 1 | S1-U data transfer supported |
| SMS without combined attach for CIoT (SMS-CIoT) (octet 3, bit 5) | |
| Bit 5 | |
| 0 | SMS without combined attach is not requested |
| 1 | SMS without combined attach is requested (Note 1) |
| SMS data only indicator (SMS-data-only) (octet 3, bit 6) | |
| Bit 6 | |
| 0 | Data transfer is not limited to SMS data |
| 1 | Data transfer is limited to SMS data |
| IP data type (IP-data) (octet 3, bit 7) | |
| Bit 7 | |
| 0 | IP data type is not requested |
| 1 | IP data type is requested |
| Non-IP data type (Non-IP-data) (octet 3, bit 8) | |
| Bit 8 | |
| 0 | Non-IP data type is not requested |
| 1 | Non-IP data type is requested |

(Note 1) SMS without combined attach means to request SMS services for EPS attached UE 110.

When the MME 116 or equivalent network node receives and processes the attach request message 740, it may either accept or reject the request. In either case, the MME 116 sends an attach response message 745 (see FIG. 9), as will be described in more detail below.

In an embodiment, when the UE 110 has not requested CIoT optimizations by including the preferred network behavior indication IE in the attach request message 740, the MME 116 may send attach response message 745 as an ATTACH ACCEPT together with an ACTIVATE DEFAULT EPS BEARER CONTEXT REQUEST message contained in an ESM message container information element to activate the default bearer and establish an ECM connection. The network may also initiate the activation of dedicated bearers towards the UE 110 by invoking the dedicated EPS bearer context activation procedure.

When the UE 110 has requested CIoT optimizations by including a preferred network behavior indication IE in the attach request message 740, and if the MME 116 supports one or more CIoT optimizations requested and decides to accept the attach request, the MME 116 indicates the MME 116's CIoT capabilities and accepted network behavior in the supported network behavior indication IE in the attach response message 745.

In an embodiment, the supported network behavior indication IE includes the supported type of CIoT optimizations (either CP-CIoT or UP-CIoT or both) and the accepted optimization usage (CP-CIoT or UP-CIoT). If the UE 110 supports only CP-CIoT optimization or the UE 110 supports both CP-CIoT and UP-CIoT but prefers to use CP-CIoT or the UE 110 supports both CP-CIoT and UP-CIoT but does not support S1U data transfer, and the network supports CP-CIoT optimization, the MME 116 may indicate CP-CIoT as accepted optimization usage in the supported network behavior indication IE. If the UE 110 supports only UP-CIoT optimization or the UE 110 supports both CP-CIoT and UP-CIoT but prefers to use UP-CIoT, and if the network supports UP-CIoT optimization, the MME 116 shall indicate UP-CIoT as accepted optimization usage in the supported network behavior indication IE.

In one embodiment, an attach response message 745 accepting the attach request may include one or more of the content summarized in the following table:

| Information Element | Type/Reference |
|---|---|
| Protocol discriminator | Protocol discriminator |
| Security header type | Security header type |
| Attach accept message identity | Message type |
| EPS attach result | EPS attach result |
| ... | |
| Supported Network Behaviour information (a.k.a., EPS network feature support) | Supported network behaviour information (a.k.a., EPS network feature support) |

Figure 13:
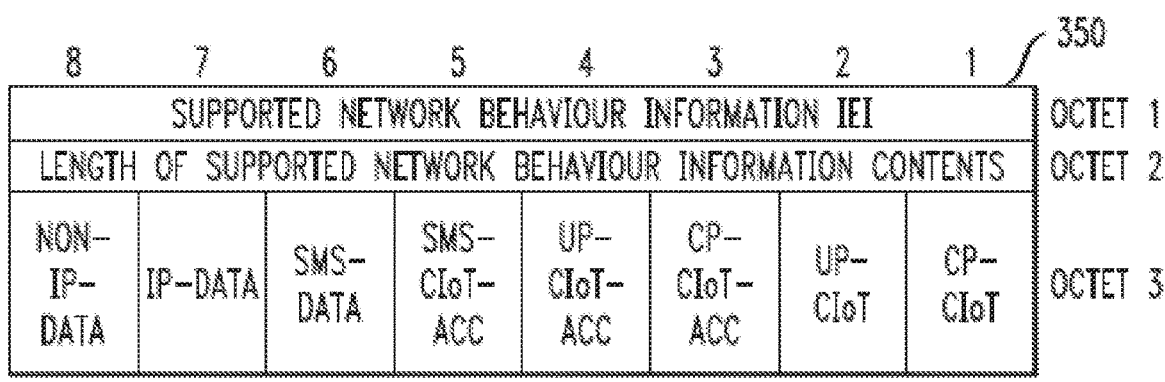
FIG. 13 illustrates a block diagram of a structure of a supported network behavior information element according to one embodiment.

FIG. 13 is a block diagram illustrating the structure of a supported network behavior indication information element 350 according to one embodiment. The supported network behavior IE may also be known as an EPS network feature support. It is used to indicate to the UE 110 the set of CIoT optimization features that are supported by the network and the accepted CIoT optimization behavior. In some embodiments, the supported network behavior IE is a type 4 information element with a length of 3 octets. The supported network behavior indication information element 350 may include the values given in the following table:

| Control Plane CIoT EPS optimization indicator (CP-CIoT) (octet 3, bit 1) | |
|---|---|
| Bit 1 | |
| 0 | Control Plane CIoT EPS optimization not supported |
| 1 | Control Plane CIoT EPS optimization supported |
| User Plane CIoT EPS optimization indicator (UP-CIoT) (octet 3, bit 2) | |
| Bit 2 | |
| 0 | User Plane CIoT EPS optimization not supported |
| 1 | User Plane CIoT EPS optimization supported |
| CP-CIoT accept indicator (CP-CIoT-ACC) (octet 3, bit 3) | |
| Bit 2 | |
| 0 | CP-CIoT not accepted |
| 1 | CP-CIoT accepted |
| UP-CIoT accept indicator (CP-CIoT-ACC) (octet 3, bit 4) | |
| Bit 2 | |
| 0 | UP-CIoT not accepted |
| 1 | UP-CIoT accepted |
| SMS without combined attach accept indicator (SMS-CIOT-ACC) (octet 3, bit 5) | |
| Bit 5 | |
| 0 | SMS without combined attach not accepted |
| 1 | SMS without combined attach accepted |
| SMS data accept indicator (SMS-DATA) (octet 3, bit 6) | |
| Bit 6 | |
| 0 | SMS data transfer not supported |
| 1 | SMS data transfer supported |
| IP data type accept indicator (IP-DATA) (octet 3, bit 7) | |
| Bit 7 | |
| 0 | IP data type not accepted |
| 1 | IP data type accepted |
| Non-IP data type accept indicator (NON-IP-DATA) (octet 3, bit 8) | |
| Bit 8 | |
| 0 | Non-IP data type not accepted |
| 1 | Non-IP data type accepted |

Figure 14:
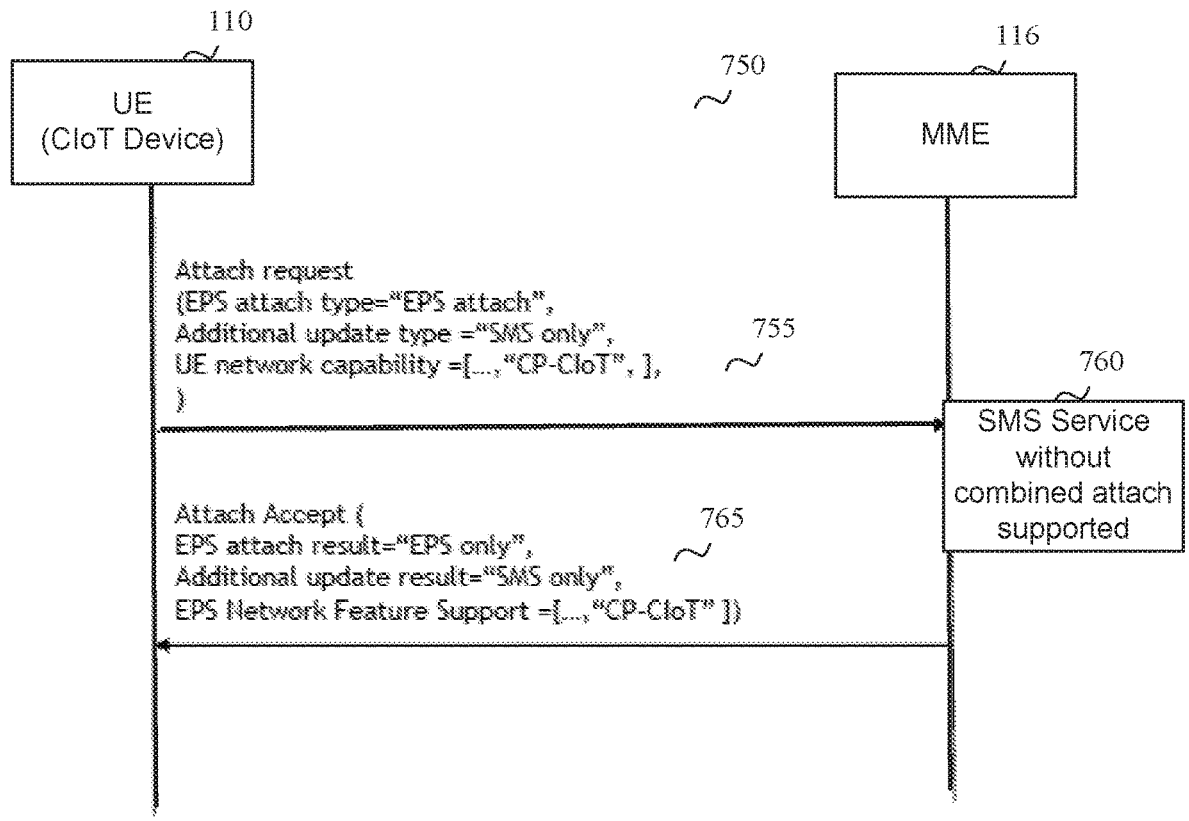
FIG. 14 illustrates a flow diagram of an embodiment of a method for an attach procedure for short messaging service (SMS).

FIG. 14 illustrates a flow diagram of an embodiment of a method 750 for an attach procedure for short messaging service (SMS). In an embodiment, the UE 110 may request SMS service only and CP-CIoT service limited to SMS data. The UE 110 may generate and transmit an attach request message that indicates SMS-data-only (Step 755). For example, the attach request may include an EPS attach type of EPS attach, a UE 110 network capability that include CP-CIoT, and an addition update type of "SMS only" to signal to the network that the UE 110 is only requesting SMS service and small data transfer is limited to SMS data. The UE 110 may also indicate "SMS without combined attach requested" when the UE 110 does not need SMS services through combined attach. The attach request message 740 may omit an ESM message container IE to avoid establishment of a default PDN connection. Preferably, the attach request 740 does not include a "Voice domain preference" and UE 110's "usage setting" IE if the Attach Request is sent on an NB-IoT RAT.

In an embodiment, the MME 116 supports SMS service without combined attach (step 760). Then in response to the UE 110 requesting "SMS without combined attach", the MME 116 transmits an attach accept message that indicates SMS service without combined attach is accepted (step 765). For example, the attach accept message may include that SMS for EPS only without combined attach is accepted in a supported network behavior indication IE. The attach accept message may include an EPS attach result IE that indicates EPS only, an EPS Network Feature Support that includes CP-CIoT support and an additional update result that includes an SMS only support.

When the UE 110 requests data transfer for "SMS-data-only", the MME 116 does not establish a default PDN connection. The MME 116 may ignore the PDN CONNECTIVITY REQUEST message, if any, that is included in the ESM message container IE in the ATTACH REQUEST message. In an embodiment, the supported network behavior indication IE also preferably includes a value indicating whether IP data type or non-IP data type is acceptable. The MME 116 224 may indicate "IP data is not accepted" and "non-IP data type is accepted" in the Supported network behavior indication IE.

Note that in a case where the UE 110 requested "SMS without combined attach" and SMS in MME 116 feature is not supported by the MME 116, the MME 116 may still provide SMS service using SGs if SGs interface is available and SMSoSGs is supported over SGs. Whether SMS in MME 116 or SMSoSGs is used for providing SMS service is transparent to the UE 110.

If the UE 110 does not indicate in its request that data transfer is for "SMS-data-only" and "IP-data" type is requested, the MME 116 may include an ACTIVATE DEFAULT EPS BEARER CONTEXT REQUEST message contained in the ESM message container information element in the attach response message to activate the default bearer. If a PDN CONNECTIVITY REQUEST message with PDN type indicating "IPv4" or "IPv6" or "IPv4v6" is included in the ESM message container IE in the attach request message, the MME 116 shall indicate in response "IP data type is accepted" in the supported network behavior indication IE.

In this embodiment, if the attach request message 740 does not include a PDN CONNECTIVITY REQUEST message in an ESM message container IE, the MME 116 shall not establish a PDN connection as part of the Attach procedure. If SCEF interface is supported, the MME 116 may establish data connection through SCEF for IP data type as and indicate "IP data accepted" in a supported network behavior indication IE.

When the UE 110 does not indicate data transfer is for "SMS-data-only" and "non-IP-data" type is requested, the MME 116 may respond as follows. When a PDN CONNECTIVITY REQUEST message with PDN type indicating "non-IP" is included in the ESM message container IE in the attach request message 740, the MME 116 may include an ACTIVATE DEFAULT EPS BEARER CONTEXT REQUEST message contained in an ESM message container IE in the attach response message 745 accepting the attach request to activate the default bearer. The MME 116 shall indicate "Non-IP data type accepted" in a supported network behavior indication IE.

When a PDN CONNECTIVITY REQUEST message is not included in an ESM message container IE in the attach request message 740, the MME 116 shall not establish a PDN connection as part of the Attach procedure. If an SCEF interface is supported, the MME 116 may establish a data connection through SCEF for a non-IP data type and indicate "Non-IP data accepted" in the supported network behavior indication IE. The MME 116 shall also indicate "EPS only" in an EPS attach result IE in the attach response message 745.

If the UE 110 is in NB-S1 mode, then the UE 110 shall set the control plane CIoT EPS optimization bit to "control plane CIoT EPS optimization supported" in the UE 110 network capability IE of the ATTACH REQUEST message. If the UE 110 is in NB-S1 mode, supports NB-S1 mode only, and requests to attach for EPS services and "SMS only", the UE 110 shall indicate the SMS only requested bit to "SMS only" in the additional update type IE and shall set the EPS attach type IE to "EPS attach" in the ATTACH REQUEST message. If the UE 110 supports CIoT EPS optimizations, it shall indicate in the UE 110 network capability IE of the ATTACH REQUEST message whether it supports EMM-REGISTERED without PDN connection. If EMM-REGISTERED without PDN connection is not supported by the UE 110 or the MME 116, or if the UE 110 wants to request PDN connection with the attach procedure, the UE 110 shall send the ATTACH REQUEST message together with a PDN CONNECTIVITY REQUEST message contained in the ESM message container IE. If EMM-REGISTERED without PDN connection is supported by the UE 110 and the MME 116, and the UE 110 does not want to request PDN connection with the attach procedure, the UE 110 shall send the ATTACH REQUEST message together with an ESM DUMMY MESSAGE contained in the ESM message container information element.

Embodiment—Attach Reject

In some instances, an attach request may be rejected by the network. The MME 116 transmits an attach response message 745 to the UE 110 indicating that the attach request is rejected. The attach response message 745 may also include an indication of a reason for the rejection.

For example, when the attach request is rejected due to a PDN CONNECTIVITY REQUEST message where the UE 110 did not request CIoT optimizations by including the preferred network behavior indication IE in the attach request message 740, the MME 116 may send the attach reject in the attach response message with an EMM cause set to "ESM failure".

If the attach request message 740 does not include a request for CIoT optimizations in the preferred network behavior indication IE and the MME 116 cannot support any of the CIoT optimizations requested, the MME 116 shall reject the UE 110's attach request with the EMM cause set to "CIoT optimization not supported". For example, this EMM cause is sent to the UE 110 when the UE 110 has requested CIoT optimizations but the MME 116 does not support the requested CIoT optimizations.

Figure 15:
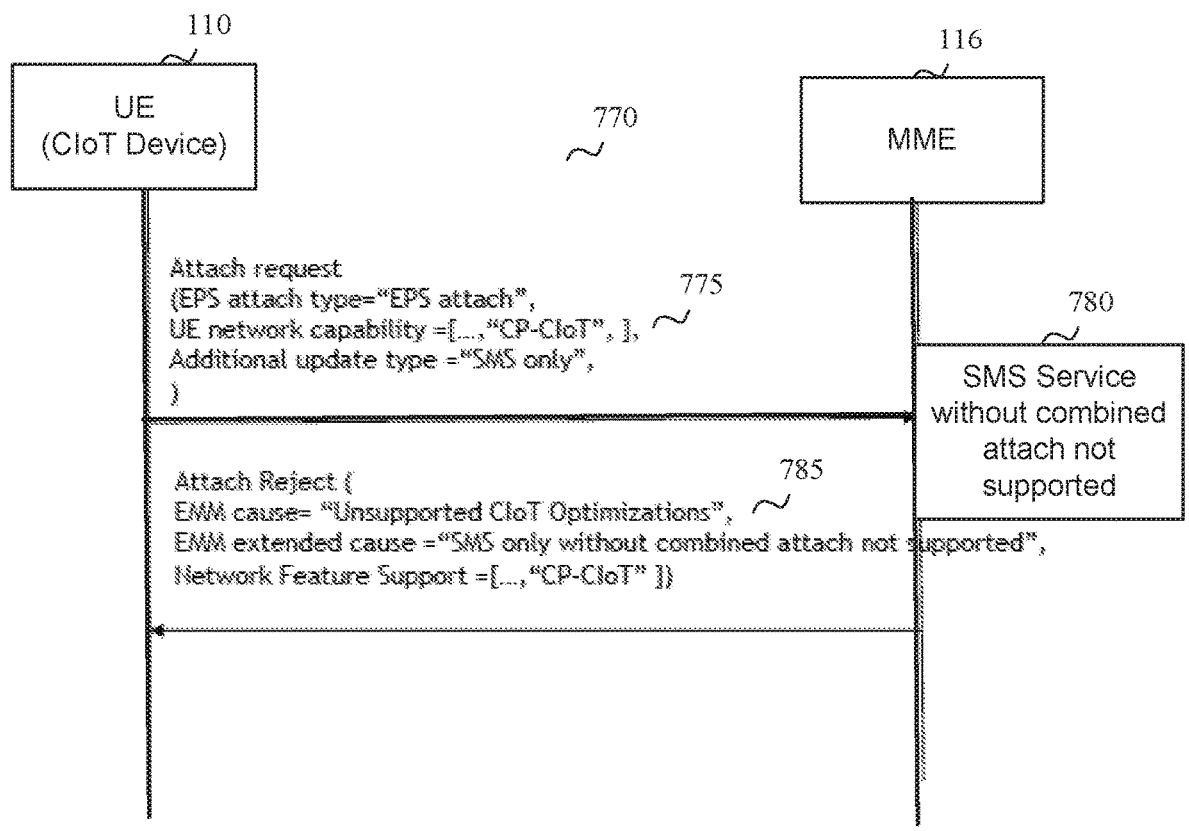
FIG. 15 illustrates a flow diagram of an embodiment of a method for an attach procedure for short messaging service (SMS).

FIG. 15 illustrates a flow diagram of an embodiment of a method 770 for an attach procedure for short messaging service (SMS). Similar to FIG. 14, in an embodiment, the UE 110 may request SMS service only and CP-CIoT service limited to SMS data. The UE 110 may generate and transmit an attach request message that indicates SMS-data-only (Step 775). However, in this embodiment, the MME 116 does not support SMS service without combined attached (Step 780). The MME 116 transmits an attach response that indicates the attach request is rejected (Step 785). The attach response may include that an EMM cause IE indicating unsupported CIoT Optimizations. The attach response may further include an EMM extended cause IE indicating that SMS only without combined attach is not supported. When the MME 116 supports other types of CIOT optimizations, the attach response may further include a network feature support IE indicating support of, e.g. CP-CIoT.

Figure 16:
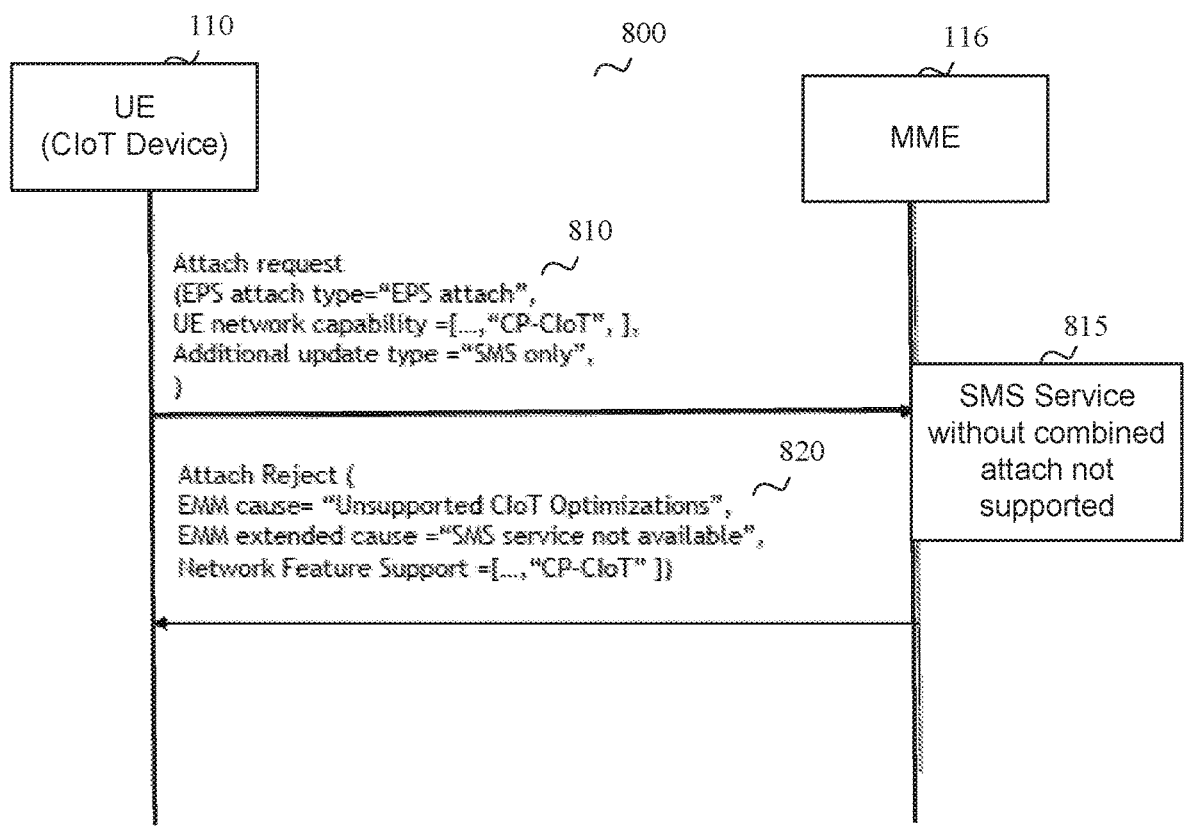
FIG. 16 illustrates a flow diagram of another embodiment of a method 800 for an attach procedure for short messaging service (SMS).

FIG. 16 illustrates a flow diagram of another embodiment of a method 800 for an attach procedure for short messaging service (SMS). Similar to FIG. 14, in an embodiment, the UE 110 may request SMS service only and CP-CIoT service limited to SMS data. The UE 110 may generate and transmit an attach request message that indicates SMS-data-only (Step 810). The MME 116 does not support SMS service without combined attached (Step 815). The MME 116 transmits an attach response that indicates the attach request is rejected (Step 820). The attach response may include an EMM cause IE indicating unsupported CIoT Optimizations. The attach response may further include an EMM extended cause IE indicating that SMS service is not available. When the MME 116 supports other types of CIOT optimizations, the attach response may further include a network feature support IE indicating support of, e.g. CP-CIoT.

Figure 17:
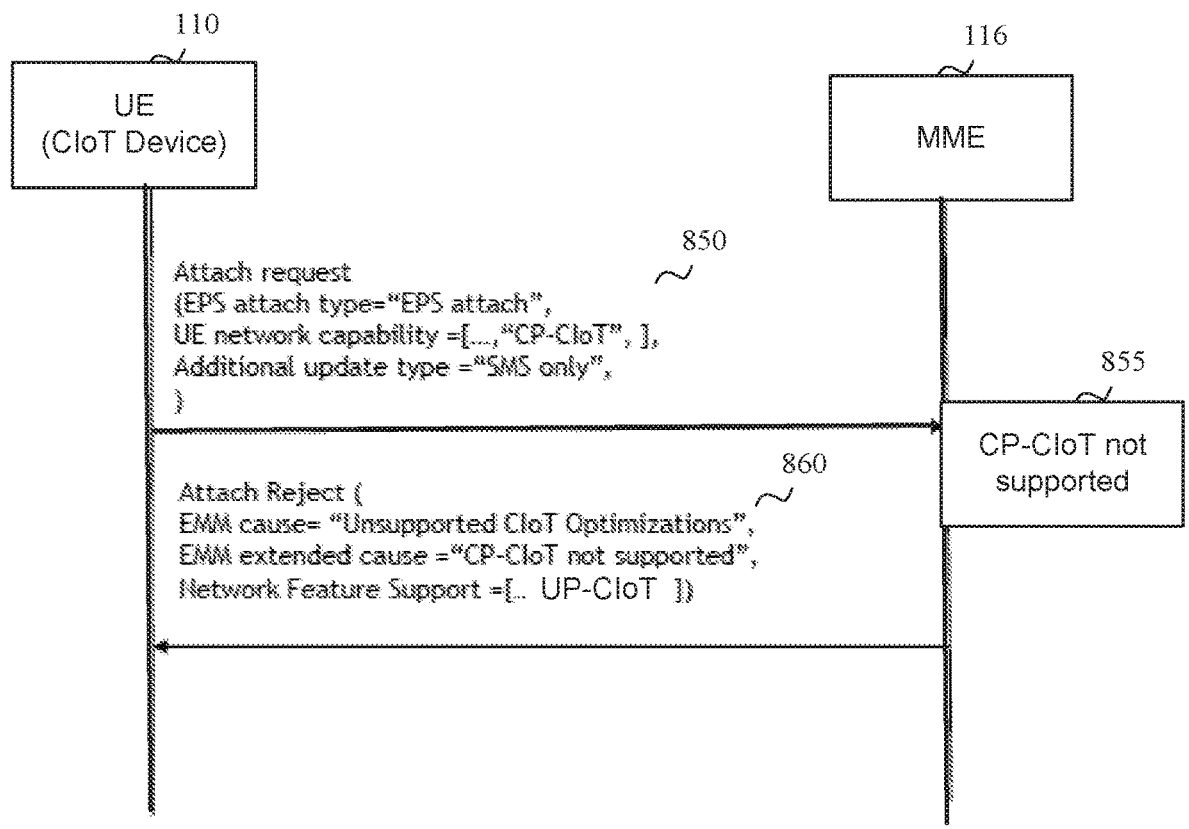
FIG. 17 illustrates a flow diagram of another embodiment of a method 800 for an attach procedure for short messaging service (SMS).

FIG. 17 illustrates a flow diagram of another embodiment of a method 800 for an attach procedure for short messaging service (SMS). Similar to FIG. 14, in an embodiment, the UE 110 may request SMS service only and CP-CIoT service limited to SMS data. The UE 110 may generate and transmit an attach request message that indicates SMS-data-only (Step 850). In this embodiment, the MME 116 does not support CP-CIoT services (Step 855). The MME 116 transmits an attach response that indicates the attach request is rejected (Step 860). The attach response may include an EMM cause IE indicating unsupported CIoT Optimizations. The attach response may further include an EMM extended cause IE indicating that CP-CIoT is not supported. When the MME 116 supports other types of CIOT optimizations, the attach response may further include a network feature support IE indicating support of, e.g. UP-CIoT.

When the UE 110 receives an EMM cause value that the MME 116 does not support a CIoT optimization, the UE 110 may reject the PLMN selection. The UE 110 may enter a state of EMM-Deregistered and perform a PLMN search to select another PLMN that may support the desired CIoT optimization.

If EMM-REGISTERED without PDN connection is supported by the UE 110 and the MME 116, the MME 116 receives an ATTACH REQUEST message with an ESM message included in the ESM message container information element, and the ESM sublayer in the MME 116 detects a message error, the MME 116 may decide to proceed with the attach procedure or to reject it. When sending the ATTACH ACCEPT or ATTACH REJECT message to the UE 110, the MME 116 shall include the ESM message provided by the ESM layer in the ESM message container information element.

Figure 18:
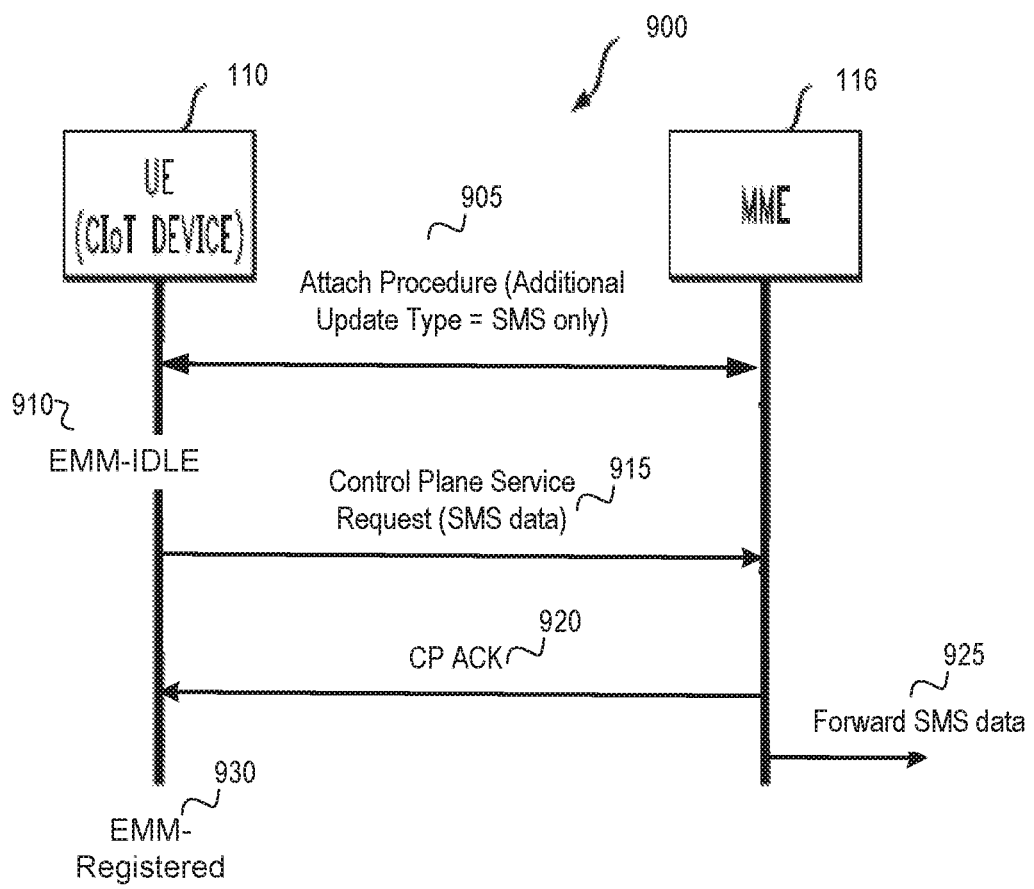
FIG. 18 illustrates a flow diagram of another embodiment of a method 800 for a service request procedure for short messaging service (SMS).

FIG. 18 illustrates a flow diagram of another embodiment of a method 900 for a service request procedure for short messaging service (SMS). The attach procedure is performed as described with respect to FIG. 14 for EPS attach for CP-CIoT services and SMS only data (Step 905). The UE 110 then enters the idle mode (EMM-IDLE) (Step 910). In the EMM-IDLE mode, the UE 110 does not have an RRC connection, e.g. the UE 110 does not have an established signaling connection to the network (Signaling radio bearer SRB) or data radio bearer (DRB). The UE 110 receives pending SMS data. The SMS data may be generated by a CIoT application or other user application in the user data plane. The UE 110 initiates a service request procedure by transmitting a control plane service request to the MME 116. The UE inserts the SMS data into an information element in the control plane service request. The information element may be a message container for SMS only data or another type of information element. The UE may set a service type value to indicate mobile originating SMS (MO-SMS) transfer. The UE 110 may also set the UE network capability to indicate SMS without combined attach. The UE 110 transmits the service request message to the MME 116 using the NAS control signaling protocol (Step 915). The MME 116 receives the control plane service request message. The MME may forward the SMS data to a node including a Service Capability Exposure Function (SCEF) or to an SMS processing node (STEP 925). The MME 116 may also send a control plane acknowledge (CP ACK) to the UE 110 to acknowledge receipt of the control plane service request (Step 920). The UE 110 then enters an EMM-registered state (Step 930).

Embodiment—User Plane CIoT EPS Optimization

An enhancement that has been specified as part of User Plane CIoT (UP-CIoT) EPS optimizations is that an RRC connection between a UE 110 and eNodeB may be suspended and resumed. In LTE an RRC connection is usually released after 10 to 20 seconds of inactivity. Another RRC connection procedure has to be performed to establish a new RRC connection when new IP packets arrive from higher layers of the protocol stack. Generally, this is not a problem when the amount of data that is transferred exceeds this overhead. However, releasing an RRC connection and then performing another RRC connection process to establish a new RRC connection is burdensome to transfer just a few bytes of data by a CIoT enabled UE 110. In an embodiment, the context of an RRC connection is preserved and the RRC connection is suspended rather than releasing it.

Embodiment—Header Compression for CIoT

Robust overhead compression (ROHC) for Cellular IoT for NB-IoT services via control plane optimization may be implemented by the UE 110 and the MME 116. The UE 110 and the MME 116 support robust header compression (ROHC) framework if control plane CIoT EPS optimization is supported for PDN connections of IP PDN type. For uplink IP data, UE 110 implements ROHC compressor, and MME 116 implements the ROHC decompressor. For downlink IP data, MME 116 implements the ROHC compressor, and UE 110 implements the ROHC decompressor. The uplink and downlink ROHC channels are bound by UE 110 and MME 116 to support ROHC feedback. The configurations for the header compression are established during the PDN connection establishment procedure.

Figure 19:
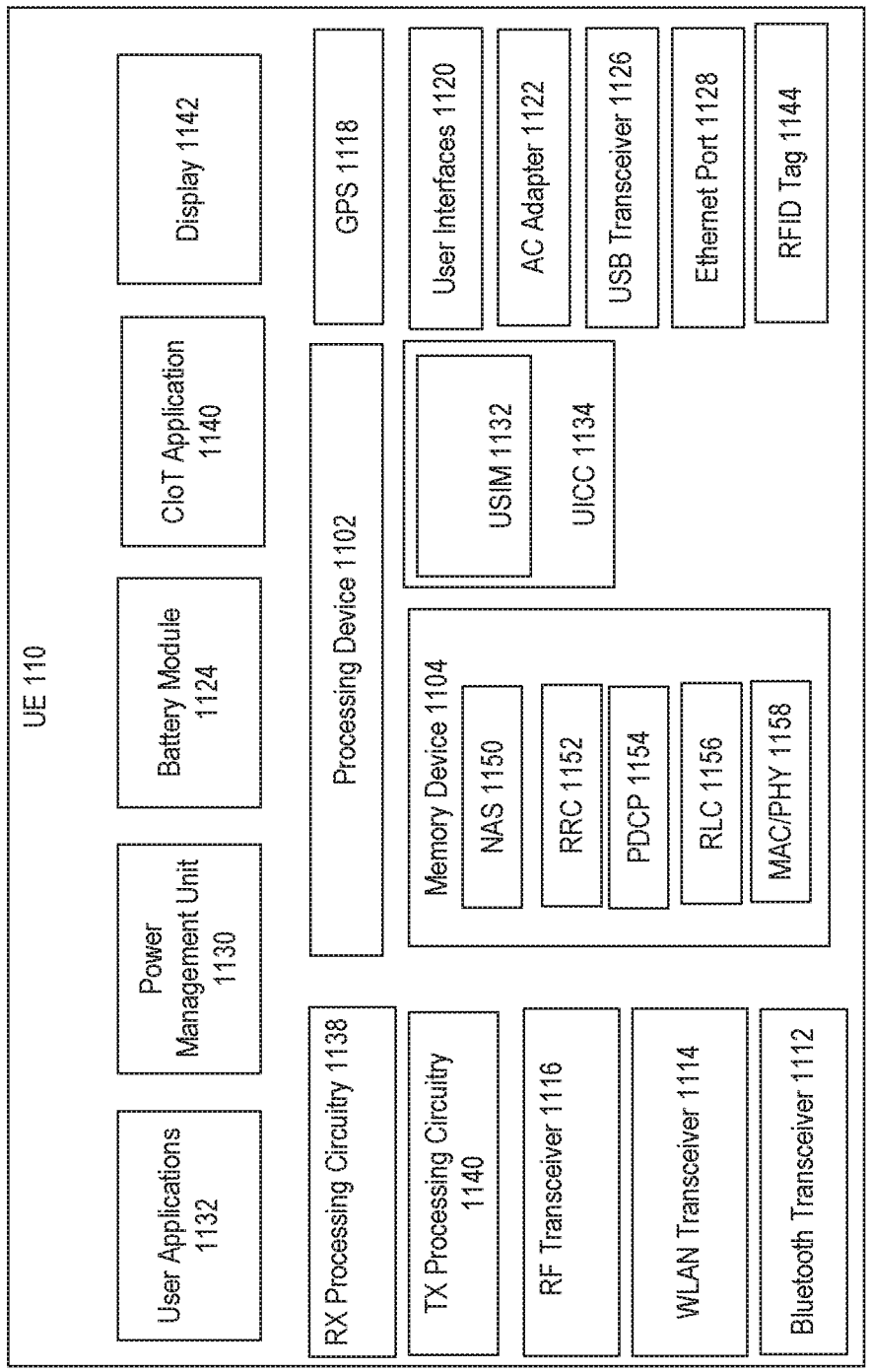
FIG. 19 illustrates a schematic block diagram of an embodiment of user equipment (UE 110).

FIG. 19 illustrates a schematic block diagram of an embodiment of user equipment (UE 110) 110. The UE 110 may include any type of CIoT enabled device, including a sensor, medical device, RFID tag or a user device, such as a phone, tablet, watch, laptop, or other type of processing device. The UE 110 described herein is for illustrative purposes only. The UE 110 components are exemplary and additional or alternative components and functions may be implemented. In addition, one or more of the functions or components shown herein may not be present or may be combined with other components or functions.

The UE 110 includes a processing device 1102 and a memory device 1104 that stores operational instructions that when performed by the processing device 1102 may perform one or more of the functions described herein with respect to the UE 110. For example, the memory device 1104 may include instructions and data that when used by the processing device 1102 processes functions of a protocol stack, including the NAS layer 1150, Radio Resource Control (RRC) 1152, Packet Data Convergence Control (PDCP) 1154, Radio Link Control (RLC) 1156 and Medium Access Control and physical layer functions 1158. For the Control Plane CIoT EPS optimization, data exchange between UE 110 and an eNB is done on the RRC level and between the UE 110 and MME 116 is done at the NAS level. In addition, the UE 110 may also include a UICC 1134 that includes a USIM 1132.

The UE 110 may further include a Bluetooth transceiver 1112, a WLAN (IEEE 802.11x compliant) transceiver 1114, and global positioning satellite (GPS) transceiver 1118. The WLAN transceiver 1114 may operate as a non-3GPP access interface to a cellular network. The UE 110 also includes an RF transceiver 1116 compliant with Universal Mobile Telecommunications System (UMTS) Terrestrial Radio Access Network (UTRAN), Long Term Evolution (LTE) Evolved UTRAN (E-UTRAN), LTE-Advanced (LTE-A) or other wireless network protocols. The UE 110 includes RX processing circuitry 1138 and TX processing circuitry 1140.

The UE 110 may further include user applications 1132, AC adapter 1122, battery module 1124, USB transceiver 1126 and Ethernet Port 1128. The UE 110 may further include one or more user interfaces 1120, such a digital camera, touch screen controller, speaker, microphone or display 1142. The UE 110 may also include a power management unit 1130 and battery module 1124. The UE 110 may also include a CIoT Application 1140 that generates user data, such as SMS data, IP data or non-IP data. One or more internal communication buses (not shown) may communicatively couple one or more of the components of the UE 110.

Figure 20:
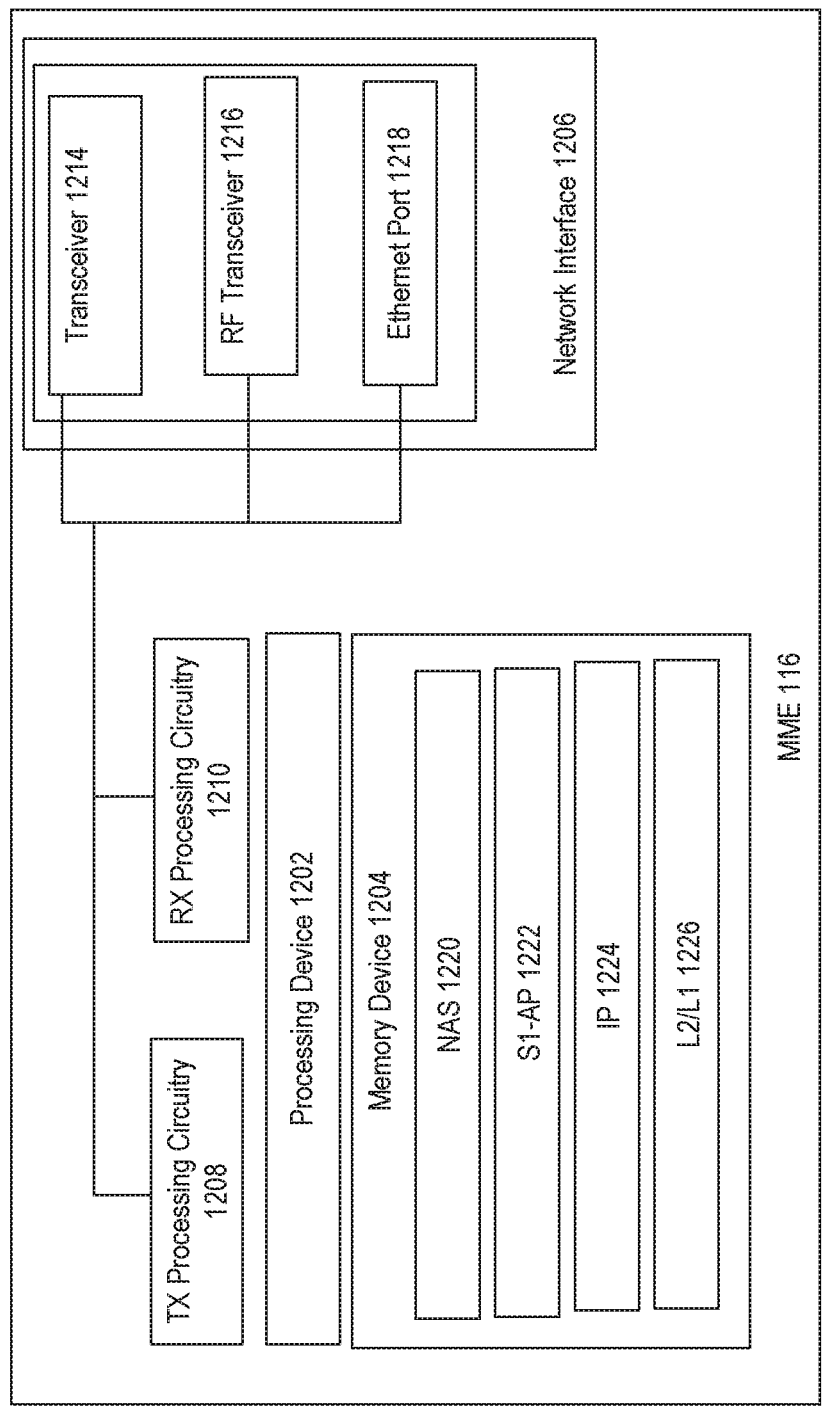
FIG. 20 illustrates a schematic block diagram of an embodiment of an exemplary MME 116.

FIG. 20 illustrates a schematic block diagram of an embodiment of an exemplary MME 116. The MME 116 described herein is for illustrative purposes only. One or more of the functions or components shown herein may not be present or may be combined with other components or functions. Additional components or functions may also be included. The MME 116 includes a processing device 1202 and a memory device 1204 that stores instructions that when performed by the processing device 1202 may perform one or more of the functions described herein with respect to the MME 116. For example, the memory device 1204 may include instructions and data that when used by the processing device 1202 processes functions of a protocol stack, including the NAS layer 1220, S1 Application Protocol (S1AP) 1222, IP layer 1224 and Layer2/Layer1 functions 1226. For the Control Plane CIoT EPS optimization, data exchange between the UE 110 and MME 116 is done at the NAS control plane level.

The MME 116 includes a Network Interface 1206, transmit (TX) processing circuitry 1208, and receive (RX) processing circuitry 1110. The Network interfaces 1206 is configured for communicating with one or more eNodeBs 106 and core network nodes (such as SCEF 132 or S-GW 118 or P-GW 130). The network interface 1206 may include one or more types of transceivers 1214, including an RF transceiver 1216, or one or more types of ports, such as Ethernet port 1218.

The dynamic PCDP integrity protection described herein for user plane data provides integrity protection based on real time conditions or detected potential attacks. The embodiments described herein define appropriate trigger conditions to enable the integrity protection based on radio bearer characteristics, such as QCI values. The embodiments also disable PDCP integrity protection dynamically to more optimally control consumption of resources.

A processing device as described herein includes at least one processing device, such as a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. A memory device is a non-transitory memory device and may be an internal memory or an external memory, and the memory device may be a single memory device or a plurality of memory devices. The memory device may be one or more of a read-only memory, random access memory, volatile memory, non-volatile memory, static memory, dynamic memory, flash memory, cache memory, and/or any non-transitory memory device that stores digital information.

As may be used herein, the term "operable to" or "configurable to" indicates that an element includes one or more of circuits, instructions, modules, data, input(s), output(s), etc., to perform one or more of the described or necessary corresponding functions and may further include inferred coupling to one or more other items to perform the described or necessary corresponding functions. As may also be used herein, the term(s) "coupled", "coupled to", "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, network element, etc.). As may further be used herein, inferred connections (i.e., where one element is connected to another element by inference) includes direct and indirect connection between two items in the same manner as "connected to".

Note that the aspects of the present disclosure may be described herein as a process that is depicted as a schematic, a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The various features of the disclosure described herein can be implemented in different systems and devices without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

In the foregoing specification, certain representative aspects of the invention have been described with reference to specific examples. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described. For example, the components and/or elements recited in any apparatus claims may be assembled or otherwise operationally configured in a variety of permutations and are accordingly not limited to the specific configuration recited in the claims.

Furthermore, certain benefits, other advantages and solutions to problems have been described above with regard to particular embodiments; however, any benefit, advantage, solution to a problem, or any element that may cause any particular benefit, advantage, or solution to occur or to become more pronounced are not to be construed as critical, required, or essential features or components of any or all the claims.

As used herein, the terms "comprise," "comprises," "comprising," "having," "including," "includes" or any variation thereof, are intended to reference a nonexclusive inclusion, such that a process, method, article, composition or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

Moreover, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is intended to be construed under the provisions of 35 U.S.C. § 112(f) as a "means-plus-function" type element, unless the element is expressly recited using the phrase "means for" or, in the case of a method claim, the element is recited using the phrase "step for."

The invention claimed is:

1. User equipment (UE), comprising:
   a wireless transceiver configured to communicate with a network; and
   processing circuitry including at least one processing device and at least one memory device, wherein the processing circuitry is configured to:
      enter into an idle state without an established signaling connection to the network;
      obtain pending user data for transmission;
      generate an indication that subsequent downlink data is not expected;
      insert the user data and the indication into a control plane service request message; and
      transmit the control plane service request message to the network using a control signaling protocol.

2. The UE of claim 1, wherein the processing circuitry is configured to generate an indication that downlink data transmission is not needed by:
   generating an information element in the control plane service request that indicates an acknowledgement subsequent to transmission of the control plane service request message to the network is not expected.

3. The UE of claim 2, wherein the processing circuitry is further configured to:
   end control plane service request when the information element in the control plane service request indicates that subsequent downlink data is not expected.

4. The UE of claim 1, wherein the processing circuitry is further configured to:
   generate a data type field that indicates an IP data type, wherein the user data includes an IP packet.

5. The UE of claim 1, wherein the processing circuitry is configured to:
   enter into a registered state in response to transmission of the control plane service request message.

6. The UE of claim 1, wherein the processing circuitry is further configured to insert the user data into a control plane service request message by:
   inserting the user data into an information element; and
   indicating a control plane network service in the control plane service request message.

7. The UE of claim 6, wherein the processing circuitry is further configured to indicate a control plane cellular internet of things (CP-CIoT) service in the control plane service request message.

8. The UE of claim 1, wherein the processing circuitry is further configured to:
   generate a control plane attach request message and indicate a preferred network capability value in the control plane attach request message, wherein the preferred network capability value indicates at least one of: UP-CIoT, CP-CIoT or SMS-data-only.

9. The UE of claim 8, wherein the processing circuitry is further configured to:
   receive an attach response indicating a rejection of the control plane attach request message, wherein a cause information element in the attach response includes a value indicating an unsupported CIoT optimization.

10. A Mobility Management Entity (MME) node, comprising:
    a network interface configured to communicate with user equipment (UE) over a control plane signaling channel; and
    processing circuitry including at least one processing device and at least one memory device, wherein the processing circuitry is configured to:
       receive a control plane service request message from the UE;
       extract user data from a message information element in the control plane service request message;
       extract an indication in the control plane service request message that subsequent downlink data is not expected;
       end a signaling plane session with the UE in response to the information element in the control plane service request that indicates subsequent downlink data is not expected; and
       forward the user data to another network node.

11. The MME of claim 10, wherein the indication in the control plane service request message that subsequent downlink data is not expected indicates an acknowledgement subsequent to transmission of the control plane service request message to the network is not expected.

12. The MME node of claim 10, wherein the processing circuitry is configured to:
    determine a type of the user data includes non-IP data; and
    forward the non-IP data to a node including a Service Capability Exposure Function (SCEF).

13. The MME node of claim 10, wherein the processing circuitry is further configured to:
    determine a type of the user data includes IP data; and
    forward the IP data to a packet gateway.

14. The MME node of claim 10, wherein the processing circuitry is further configured to:
  receive an attach request message from the UE;
  determine the attach request message requests CP-CIoT services with SMS only data without combined attach; and
  generate an attach response indicating a rejection of the attach request and including a cause information element in the attach response indicating an unsupported CIoT optimization.

15. User equipment (UE), comprising:
  a wireless transceiver configured to communicate with a network; and
  processing circuitry including at least one processing device and at least one memory device, wherein the processing circuitry is configured to:
    enter into an idle state without an established signaling connection to the network;
    obtain pending short message service (SMS) data for transmission;
    generate an indication that subsequent downlink data is not expected;
    insert the SMS data and the indication into a control plane service request message; and
    transmit the control plane service request message to the network using a control signaling protocol.

16. The UE of claim 15, wherein the processing circuitry is configured to:
  insert the SMS data into an SMS message container in the control plane service request message.

17. The UE of claim 15, wherein the processing circuitry is configured to generate an indication that downlink data transmission is not expected by:
  generating an information element in the control plane service request that indicates an acknowledgement subsequent to transmission of the control plane service request message to the network is not expected.

18. The UE of claim 17, wherein the processing circuitry is further configured to:
  end control plane service request when the information element in the control plane service request indicates that subsequent downlink data is not expected.

19. The UE of claim 15, wherein an S1 signaling connection is released when the information element in the control plane service request indicates that subsequent downlink data is not expected.

20. The UE of claim 15, wherein the processing circuitry is further configured to:
  generate an indication that downlink data transmission is expected; and
  retain an S1 signaling connection in response to the indication that downlink data transmission is expected.

* * * * *